US012487790B2

(12) United States Patent
Wang et al.

(10) Patent No.: US 12,487,790 B2
(45) Date of Patent: Dec. 2, 2025

(54) SCREEN PROJECTION METHOD FOR ELECTRONIC DEVICE AND ELECTRONIC DEVICE

(71) Applicant: HONOR DEVICE CO., LTD., Shenzhen (CN)

(72) Inventors: Dongwei Wang, Shenzhen (CN); Ping Yu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/564,336

(22) PCT Filed: Jun. 8, 2022

(86) PCT No.: PCT/CN2022/097654
§ 371 (c)(1),
(2) Date: Nov. 27, 2023

(87) PCT Pub. No.: WO2022/257977
PCT Pub. Date: Dec. 15, 2022

(65) Prior Publication Data
US 2024/0192912 A1 Jun. 13, 2024

(30) Foreign Application Priority Data
Jun. 9, 2021 (CN) .......................... 202110643967.1

(51) Int. Cl.
*G06F 3/14* (2006.01)
*H04L 67/146* (2022.01)

(52) U.S. Cl.
CPC .......... *G06F 3/1454* (2013.01); *H04L 67/146* (2013.01)

(58) Field of Classification Search
CPC ..... G06F 3/1454; H04L 67/146; H04L 67/51; H04L 67/06; H04L 67/1095; H04L 67/30;
(Continued)

(56) References Cited

U.S. PATENT DOCUMENTS 9,591,680 B2 * 3/2017 Kim ...................... H04W 76/14
10,609,092 B2 * 3/2020 Oyamada .............. G06F 3/1438
(Continued)

FOREIGN PATENT DOCUMENTS

CN 103618941 A 3/2014
CN 108901024 A 11/2018
(Continued)

OTHER PUBLICATIONS

Schulzrinne et al., "Real Time Streaming Protocol", Apr. 1998, Network Working Group, Standard Track, 1-92 (Year: 1998).*

*Primary Examiner* — William Lu
(74) *Attorney, Agent, or Firm* — WOMBLE BOND DICKINSON (US) LLP

(57) ABSTRACT

Embodiments of this application provide a screen projection method for an electronic device and an electronic device. The method includes: receiving an operation that the electronic device plays back a video, and obtaining a state identifier of the electronic device, where the state identifier indicates whether the electronic device is in a state of system-mirrored screen projection; determining, based on the state identifier, that the electronic device is not in the state of the system-mirrored screen projection; receiving a screen projection operation by a user, and obtaining first device information of a screen projection device; and performing DLNA screen projection from the electronic device to the screen projection device based on the first device information.

16 Claims, 18 Drawing Sheets

(58) Field of Classification Search
CPC ........... G09G 2354/00; G09G 2370/02; G09G 2370/025; G09G 2370/04; G09G 2370/042; G09G 2370/16; H04N 21/4122; H04N 21/43076; H04N 21/43615; H04N 21/6402; H04N 21/8173; H04N 21/43637
See application file for complete search history.

(56) References Cited

U.S. PATENT DOCUMENTS

| | | | |
|---|---|---|---|
| 10,776,068 B2* | 9/2020 | Hong | H04W 12/50 |
| 11,146,854 B2* | 10/2021 | Liu | H04N 21/4438 |
| 2013/0027613 A1* | 1/2013 | Kim | H04N 21/4316 |
| | | | 348/563 |
| 2013/0081089 A1* | 3/2013 | Kim | H04N 21/4122 |
| | | | 725/61 |
| 2013/0278484 A1* | 10/2013 | Hwang | G06F 3/1423 |
| | | | 345/2.3 |
| 2014/0002389 A1* | 1/2014 | Kim | H04N 21/43615 |
| | | | 345/1.3 |
| 2014/0026068 A1* | 1/2014 | Park | H04N 21/41265 |
| | | | 715/748 |
| 2014/0199947 A1* | 7/2014 | Jung | H04B 7/26 |
| | | | 455/566 |
| 2014/0250472 A1* | 9/2014 | Huang | H04N 21/4325 |
| | | | 725/82 |
| 2014/0325371 A1* | 10/2014 | Wilson | G06F 3/0346 |
| | | | 715/739 |
| 2015/0026580 A1* | 1/2015 | Kang | H04W 12/04 |
| | | | 455/39 |
| 2015/0095510 A1* | 4/2015 | Bhorkar | H04L 12/2805 |
| | | | 709/231 |
| 2015/0188968 A1* | 7/2015 | Lee | H04L 65/612 |
| | | | 709/219 |
| 2016/0323653 A1* | 11/2016 | Chen | H04N 21/23439 |
| 2017/0060518 A1* | 3/2017 | Hong | G06F 3/0482 |
| 2017/0134462 A1* | 5/2017 | Yu | H04L 65/1094 |
| 2017/0171496 A1* | 6/2017 | Qu | H04N 9/3147 |
| 2017/0359618 A1* | 12/2017 | Chen | H04N 21/4312 |
| 2018/0227638 A1* | 8/2018 | Jain | H04N 21/4314 |
| 2019/0340150 A1* | 11/2019 | Kim | G06Q 50/10 |
| 2021/0200501 A1* | 7/2021 | Stankoulov | G06F 3/0488 |
| 2021/0266077 A1* | 8/2021 | Tang | H04B 1/3827 |
| 2021/0318844 A1 | 10/2021 | Zhao | |
| 2022/0239718 A1* | 7/2022 | Song | H04L 67/104 |
| 2022/0272399 A1* | 8/2022 | Zhang | H04N 21/4122 |
| 2022/0279062 A1* | 9/2022 | Ye | G01S 5/04 |
| 2022/0308822 A1* | 9/2022 | Xu | H04W 12/50 |
| 2023/0021994 A1* | 1/2023 | Gu | G06F 3/1454 |
| 2023/0162324 A1* | 5/2023 | Shi | H04N 21/440281 |
| | | | 382/299 |
| 2023/0217081 A1* | 7/2023 | Mou | H04N 21/43615 |
| | | | 725/32 |

FOREIGN PATENT DOCUMENTS

| | | |
|---|---|---|
| CN | 110389738 A | 10/2019 |
| CN | 111464844 A | 7/2020 |
| CN | 112351322 A | 2/2021 |
| CN | 112788384 A | 5/2021 |
| CN | 112804574 A | 5/2021 |
| CN | 113542839 A | 10/2021 |
| EP | 3998777 A1 | 5/2022 |
| JP | 2014222432 A | 11/2014 |
| WO | 2020135461 A1 | 7/2020 |

* cited by examiner (a)

(b)

SCREEN PROJECTION METHOD FOR ELECTRONIC DEVICE AND ELECTRONIC DEVICE

CROSS-REFERENCE TO RELATED APPLICATIONS

This application is a national stage of International Application No. PCT/CN2022/097654, filed on Jun. 8, 2022, which claims priority to Chinese Patent Application No. 202110643967.1, filed on Jun. 9, 2021. The disclosures of both of the aforementioned applications are hereby incorporated by reference in their entireties.

TECHNICAL FIELD

This application relates to the field of electronic technologies, and in particular to a screen projection method for an electronic device and an electronic device.

BACKGROUND

Currently, a plurality of electronic devices support a wireless projection technology, that is, a display interface of an electronic device A (such as a mobile phone and a tablet computer) is displayed on a screen of another device B (such as a computer, a television, an all-in-one machine, or a projector) in real time, and a user can watch content of an image through the device B.

When needing to enable a function of wireless projection of the electronic device, the user usually first taps a "wireless projection" key in a system drop-down menu of the electronic device, and then selects a screen projection device from a list of available devices that are searched by the electronic device, to complete wireless projection of the electronic device. In this case, system-mirrored screen projection (referred to as mirrored screen projection) is implemented for the electronic device. To be specific, as an interface is displayed on the electronic device, the interface is displayed on the screen projection device.

However, in a process of the system-mirrored screen projection, if a video is currently played back on the electronic device, problems such as freezing, screen distortion, black borders, and audio-visual unsynchronization easily occur on a video interface of the screen projection device. As a result, screen projection effect is poor.

SUMMARY

This application provides a screen projection method for an electronic device and an electronic device. This enables a video played on electronic device to be directly projected to a screen projection device in a manner of digital living network alliance (digital living network alliance, DLNA) screen projection when the electronic device is playing back the video, to effectively improve screen projection effect.

According to a first aspect, this application provides a screen projection method for an electronic device. The method includes: receiving an operation that the electronic device plays back a video, and obtaining a state identifier of the electronic device, where the state identifier indicates whether the electronic device is in a state of the system-mirrored screen projection; determining, based on the state identifier, that the electronic device is not in the state of the system-mirrored screen projection; receiving a screen projection operation by a user, and obtaining first device information of a screen projection device, where the first device information includes at least one of an Internet protocol IP address (Internet Protocol address, IP address), a media access control MAC address (media access control address, MAC address), a universally unique identifier (universally unique identifier, UUID), a device identifier, and a device name of the screen projection device; and performing DLNA screen projection from the electronic device to the screen projection device based on the first device information.

A process of the system-mirrored screen projection is a process in which the electronic device codifies and decodes data of a display interface, and sends the coded and decoded data to the screen projection device for display. If the electronic device is currently playing back the video, the electronic device codifies and decodes a video stream, and sends the coded and decoded video stream to the screen projection device for playback. The DLNA screen projection is a technology for digital media and content service. The electronic device may send an address of the video stream to the screen projection device, and the screen projection device downloads, based on the address, a video resource for playback, to implement real-time screen projection of video data. When the electronic device plays back the video, if the electronic device is not currently in the state of the system-mirrored screen projection, the electronic device may receive an operation that the user enables a function of the system-mirrored screen projection, and projection to the screen projection device may be directly performed in a manner of the DLNA screen projection. This may resolve problems such as black borders, freezing, screen distortion, and audio-visual unsynchronization on an image. A video image that is played back is clear and smooth. This effectively improves screen projection effect, and improves viewing experience of the user without another operation performed by the user.

The screen projection operation is an operation that the user taps a "wireless projection" key in a system drop-down menu, or an operation that the user taps a "wireless projection" key through a "settings" path of the electronic device.

Optionally, the video that is played back by the electronic device may be played back online by using a video application or played back on a local device through a video player.

With reference to the first aspect, in some implementations of the first aspect, the performing DLNA screen projection from the electronic device to the screen projection device based on the first device information includes: searching for a first available screen projection device through a DLNA protocol, and obtaining second device information of the first available screen projection device, where the first available screen projection device is a device that is in a same local area network as the electronic device and that supports the DLNA screen projection, the second device information includes at least one of the following: an IP address, a MAC address, a UUID, a device identifier, and a device name of the first available screen projection device; and matching the first device information with the second device information, and if the first device information is successfully matched with the second device information, performing DLNA screen projection from the electronic device to the screen projection device.

Because the screen projection device is searched through some mirroring protocols without a local area network, such as a Miracast protocol. Therefore, for a same device, an IP address searched through the mirroring protocol is different from an IP address searched through the DLNA protocol. As a result, the first device information needs to be matched with the second device information. If the matching succeeds, it is indicated that it is a same device, and the DLNA screen projection is performed from the electronic device to the screen projection device. In this way, a success rate of switching the electronic device to the DLNA screen projection is further improved.

With reference to the first aspect, in some implementations of the first aspect, the performing DLNA screen projection from the electronic device to the screen projection device includes: sending a video address of the video to the screen projection device based on the IP address of the first available screen projection device, to enable the screen projection device to download a video resource based on the video address and play back the video resource.

In this implementation, projection is performed from the electronic device to the screen projection device based on an IP address of the available screen projection device searched through the DLNA protocol (in this case, the screen projection device and the available screen projection device are a same device). This improves accuracy of the determined device for the DLNA screen projection, and improves the success rate of switching to the DLNA screen projection from the system-mirrored screen projection.

With reference to the first aspect, in some implementations of the first aspect, the receiving a screen projection operation of by user a user, and obtaining first device information of a screen projection device includes: receiving the screen projection operation, and establishing a channel connection between the electronic device and the screen projection device; and obtaining the first device information of the screen projection device.

When the electronic device receives the operation that the user enables a function of the system-mirrored screen projection, the channel connection between the electronic device and the screen projection device may be established in a manner of a peer to peer (peer to peer, P2P) network or a wireless local area network (wireless local area network, WLAN). In this case, although the channel connection has been established between the electronic device and the screen projection device, the electronic device may not push the video stream to the screen projection device, that is, in this case, a display interface of the electronic device is not displayed on the screen projection device. Further, the electronic device may push the video stream to the screen projection device. However, the screen projection device may filter out and may not display the video stream, that is, the display interface of the electronic device is not displayed on the screen projection device. Then, the DLNA screen projection is directly performed from the electronic device to the screen projection device based on device information of the screen projection device. Therefore, in this implementation, when the user watches the video, if the user determines to watch the video through the screen projection device, the user may directly perform the screen projection in the manner of the DLNA screen projection, and does not feel a process of switching to the DLNA screen projection from the system-mirrored screen projection in the viewing experience of the user. This improves the screen projection effect, and improves the viewing experience of the user.

With reference to the first aspect, in some implementations of the first aspect, the receiving the screen projection operation, and establishing a channel connection between the electronic device and the screen projection device includes: receiving the screen projection operation, and performing the system-mirrored screen projection from the electronic device to the screen projection device.

When the channel connection is established between the electronic device and the screen projection device, the video stream may be pushed to the screen projection device, to enable the screen projection device to display the video, that is, the display interface of the electronic device is displayed on the screen projection device. Then, the manner of the system-mirrored screen projection is switched to the manner of the DLNA screen projection. This effectively improves the screen projection effect, and improves the viewing experience of the user without another operation performed by the user.

With reference to the first aspect, in some implementations of the first aspect, the receiving the screen projection operation, and performing the system-mirrored screen projection from the electronic device to the screen projection device in a manner of includes: receiving the screen projection operation; searching for and displaying a second available screen projection device through a mirroring protocol; receiving an operation of selecting the second available screen projection device, to determine the screen projection device; and sending, based on the first device information, video data that is played back by the electronic device to the screen projection device for display.

When the electronic device searches for only one screen projection device, the display interface may be directly projected to the screen projection device. When a plurality of screen projection devices are searched, the list of available devices may be displayed to the user, so that the user selects a corresponding device, and the video data may be sent to the screen projection device for display. In a process of screen projection in the manner of the DLNA screen projection, the DLNA screen projection may be performed from the electronic device to the screen projection device based on the device information (for example, the IP address) of the screen projection device. The electronic device may also record the device information of the screen projection device after the system-mirrored screen projection, to perform subsequent information matching during the DLNA screen projection. This improves the success rate of switching to the DLNA screen projection.

With reference to the first aspect, in some implementations of the first aspect, after the establishing a channel connection between the electronic device and the screen projection device, the method further includes: storing a state identifier indicating that the electronic device is in the state of the system-mirrored screen projection into a configuration file, and storing the first device information of the screen projection device to a database. In this way, the database may be provided for a subsequent electronic device to obtain information about screen projection.

With reference to the first aspect, in some implementations of the first aspect, before the receiving an operation that the electronic device plays back a video, the method further includes: receiving a connection operation, and establishing the channel connection between the electronic device and the screen projection device.

In this implementation, the channel connection may be established between the electronic device and the screen projection device in advance. However, the function of mirrored screen projection is not enabled. If the user inputs the screen projection operation, the device information of the screen projection device may be obtained directly, to improve efficiency of screen projection of the electronic device.

With reference to the first aspect, in some implementations of the first aspect, the video is played back by a video application installed in the electronic device. When the user watches the video through the video application, a manner of the screen projection between the electronic device and the screen projection device is automatically switched to the DLNA screen projection from the system-mirrored screen projection. This effectively improves the screen projection effect, and improves the experience of the user in watching the video.

With reference to the first aspect, in some implementations of the first aspect, the performing the DLNA screen projection from the electronic device to the screen projection device includes: invoking, by the video application, a DLNA interface, to perform the DLNA screen projection to the screen projection device.

In a system of the electronic device, the DLNA interface may be provided for the video application or another application. When the mode of the system-mirrored screen projection of the electronic device has been enabled and the device information of the screen projection device has been obtained, the video application may invoke the DLNA interface to perform the DLNA screen projection from the electronic device to the screen projection device. This improves the experience of the user in watching the video. In addition, the user can perform other operations on the electronic device without affecting the screen projection device to play back the video.

With reference to the first aspect, in some implementations of the first aspect, the receiving an operation that the electronic device plays back a video, and obtaining a state identifier of the electronic device includes: receiving an operation that the video application plays back a video, and obtaining the state identifier from a configuration file.

In this implementation, when playing back the video, the video application actively obtains the state identifier, to further determine whether the electronic device is in the state of the system-mirrored screen projection, and further improve the success rate of switching to the DLNA screen projection.

With reference to the first aspect, in some implementations of the first aspect, the obtaining first device information of a screen projection device includes: obtaining the first device information from the database.

With reference to the first aspect, in some implementations of the first aspect, after the determining, based on the state identifier, that the electronic device is not in the state of the system-mirrored screen projection, the method further includes: listening to whether the state identifier of the electronic device is changed; and correspondingly, the obtaining first device information of a screen projection device includes: when it is listened and obtained that the state identifier is changed to the state identifier indicating that the electronic device is in the state of the system-mirrored screen projection, obtaining the first device information of the screen projection device.

In this implementation, a message that the electronic device is in the system-mirrored screen projection may be obtained at the first time by listening to the state identifier, to further improve the efficiency of screen projection of the electronic device.

According to a second aspect, this application provides an apparatus. The apparatus is included in an electronic device, and the apparatus has a function of implementing actions of the electronic device in the first aspect and the possible implementations of the first aspect. The function may be implemented by hardware, or may be implemented by hardware executing corresponding software. The hardware or the software includes one or more modules or units corresponding to the foregoing functions, for example, a receiving module or unit or a processing module or unit.

According to a third aspect, this application provides an electronic device. The electronic device includes a processor, a memory, and an interface. The processor, the memory, and the interface cooperate with each other, so that the electronic device performs any one of the methods in the technical solutions in the first aspect.

Optionally, the electronic device further includes: a video application, configured to play back a video, and obtain a state identifier from a configuration file; determine, based on the state identifier, that the electronic device is not in a state of system-mirrored screen projection; and listen to whether the state identifier of the electronic device is changed; a wireless projection module, configured to receive the screen projection operation; a screen projection capability center module, configured to search for a second available screen projection device through a mirroring protocol; a display module, configured to: display the second available screen projection device, and receive an operation of selecting the second available screen projection device, to determine the screen projection device; a multi-screen interaction module, configured to send, based on the first device information, video data that is played back by the electronic device to the screen projection device for display, where the multi-screen interaction module is further configured to store the state identifier indicating that the electronic device is in the state of the system-mirrored screen projection to the configuration file, and the wireless projection module is further configured to store the first device information of the screen projection device to a database; when the video application listens and obtains that the state identifier is changed to the state identifier indicating that the electronic device is in the state of the system-mirrored screen projection, the video application is further used to obtain the first device information from the database; the screen projection capability center module is further configured to search for a first available screen projection device through a DLNA protocol; the multi-screen interaction module is further configured to obtain second device information of the first available screen projection device, match the first device information with the second device information, and if the first device information is successfully matched with the second device information, send a video address of the video to the screen projection device based on an IP address of the first available screen projection device, to enable the screen projection device to download the video resource based on the video address and play back the video resource.

According to a fourth aspect, this application provides a chip that includes a processor. The processor is configured to read and execute a computer program stored in a memory, to perform the method in the first aspect and any possible implementation of the first aspect.

Optionally, the chip further includes the memory, and the memory is connected to the processor by using a circuit or a wire.

Further, optionally, the chip further includes a communication interface.

According to a fifth aspect, this application provides a computer-readable storage medium. The computer-readable storage medium includes a computer program, and when the computer program is executed by a processor, the processor is enabled to perform any one of the methods in the technical solutions in the first aspect.

According to a sixth aspect, this application provides a computer program product. The computer program product includes computer program code, and when the computer program code is run on an electronic device, the electronic device is enabled to perform any one of the methods in the technical solutions in the first aspect.

BRIEF DESCRIPTION OF DRAWINGS

FIG. 9($b$) is a schematic diagram of another process of switching to DLNA screen projection from mirrored screen projection of an electronic device according to an embodiment of this application;

DESCRIPTION OF EMBODIMENTS

The following describes technical solutions in embodiments of this application with reference to accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first", "second", and third mentioned below are merely intended for a purpose of description, and shall not be understood as an indication or implication of relative importance or implicit indication of the number of indicated technical features. Therefore, a feature limited by "first", "second", or "third" may explicitly or implicitly include one or more of the features.

At present, when a user determines to watch a video in a mode of system-mirrored screen projection (referred to as mirrored screen projection) of the electronic device, the user may switch the electronic device to the mode of the mirrored screen projection in the following manners.

Figure 1A:
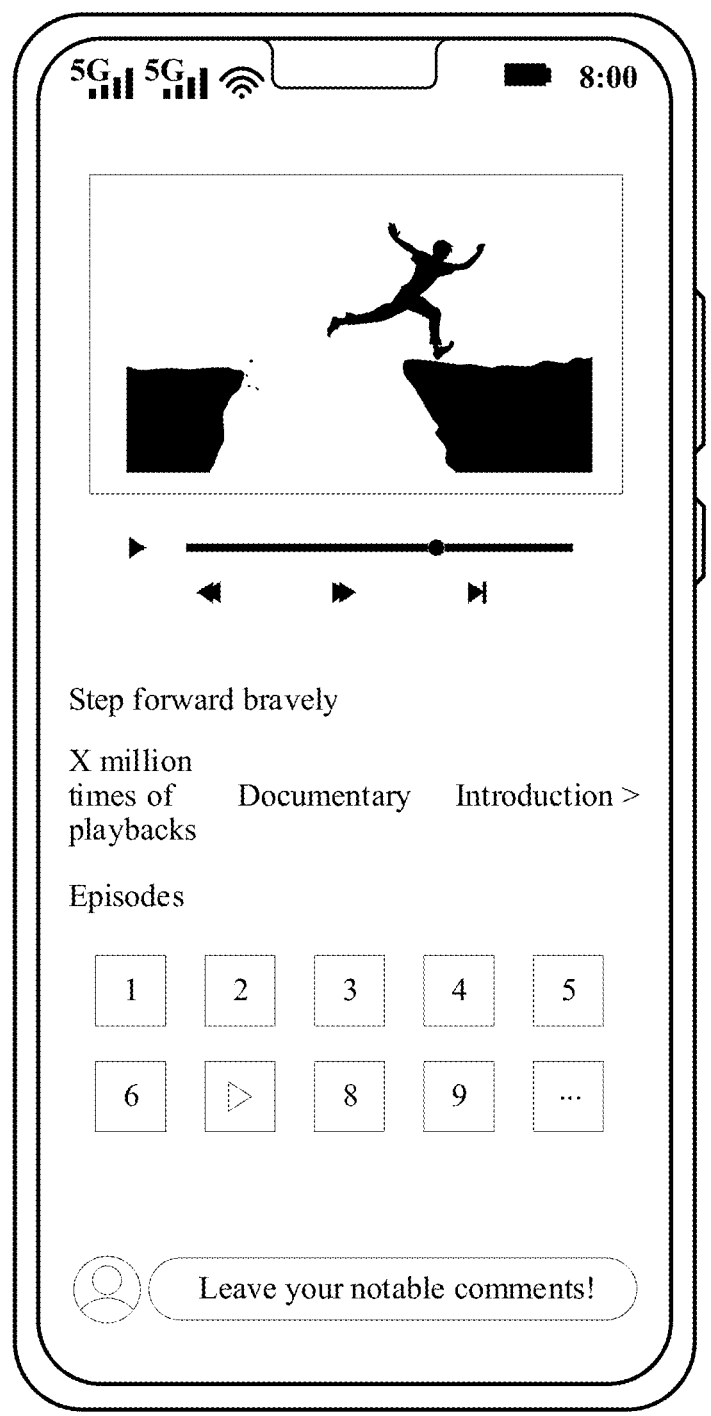
FIG. 1A is a schematic diagram of a video playback interface according to an embodiment of this application.

Manner 1: When the electronic device plays back a video by using a video application (application, APP), that is, in a display interface shown in FIG. 1A, the user may switch the electronic device to a display interface shown in FIG. 1B by using a system drop-down menu. In this interface, the user taps a "wireless projection" key to trigger the electronic device to search for and display an available device for wireless projection. In a display interface of a list of available devices shown in FIG. 1C, after the user taps on the selected screen projection device, the display interface of the electronic device may be shown on both the electronic device and the screen projection device. For a schematic diagram of comparison between effect, refer to FIG. 1D. That is, a process of the mirrored screen projection is completed.

Manner 2: The electronic device is in any display interface, such as a home screen interface, the user switches the electronic device to a display interface shown in FIG. 2A by using a system drop-down menu. In this interface, the user taps a "wireless projection" key to trigger the electronic device to search for and display an available device for wireless projection. In a display interface of a list of available devices shown in FIG. 2B, after the user taps on the selected screen projection device, a home screen interface of the electronic device may be shown on both the electronic device and the screen projection device. For a schematic diagram of comparison between effect, refer to FIG. 2C. That is, the process of the mirrored screen projection is completed. Then, the user plays back the video by using a video APP on the electronic device, and the screen projection device correspondingly displays the video interface. For a schematic diagram of comparison between effect of the electronic device and effect of the screen projection device, refer to FIG. 2D.

It may be learned from Manner 1 and Manner 2 that, the display interface of the screen projection device and the display interface of the electronic device are the same, that is, the mirrored screen projection is currently implemented. However, in this case, a large area of black borders appear on two sides of the screen projection device. Although the electronic device is switched to full-screen playback, the black borders also appear on the two sides of the screen projection device. Furthermore, in a process of video playback, the electronic device is to code and decode a video stream of video data while downloading the video data, and then display the video data to the screen projection device. Therefore, problems such as freezing, screen distortion, and audio-visual unsynchronization occur. As a result, screen projection effect is poor.

Figure 3:
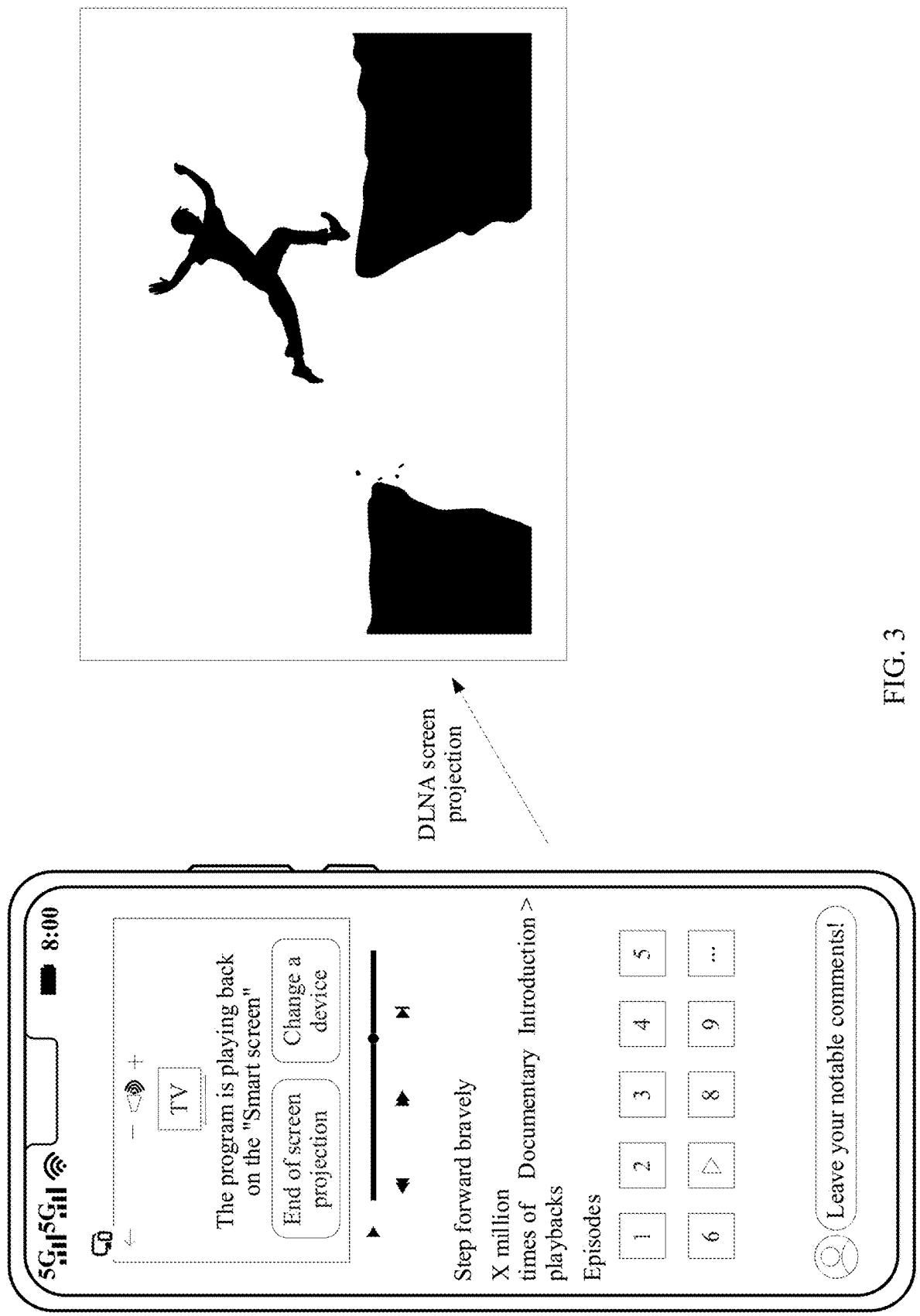
FIG. 3 is a schematic diagram of comparison between display effect of an electronic device and display effect of a screen projection device during DLNA screen projection according to an embodiment of this application.

In view of this, an embodiment of this application provides screen projection of an electronic device, which is applied to an electronic device having a function of the mirrored screen projection, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). When the electronic device plays back a video in the mode of the mirrored screen projection, the mirrored screen projection may be automatically switched to DLNA screen projection. In this case, for a schematic diagram of comparison between the display interface of the electronic device and the display interface of the screen projection device, refer to FIG. 3. The screen projection device is enabled to play back the video in full screen, and a video image is clear and smooth. This effectively improves screen projection effect, and improves user experience without another operation performed by the user. It should be noted that in embodiments of this application, a manner in which the mode of the mirrored screen projection of the electronic device is enabled may be Manner 1 and Manner 2, and a specific type of the electronic device is not limited.

Figure 4:
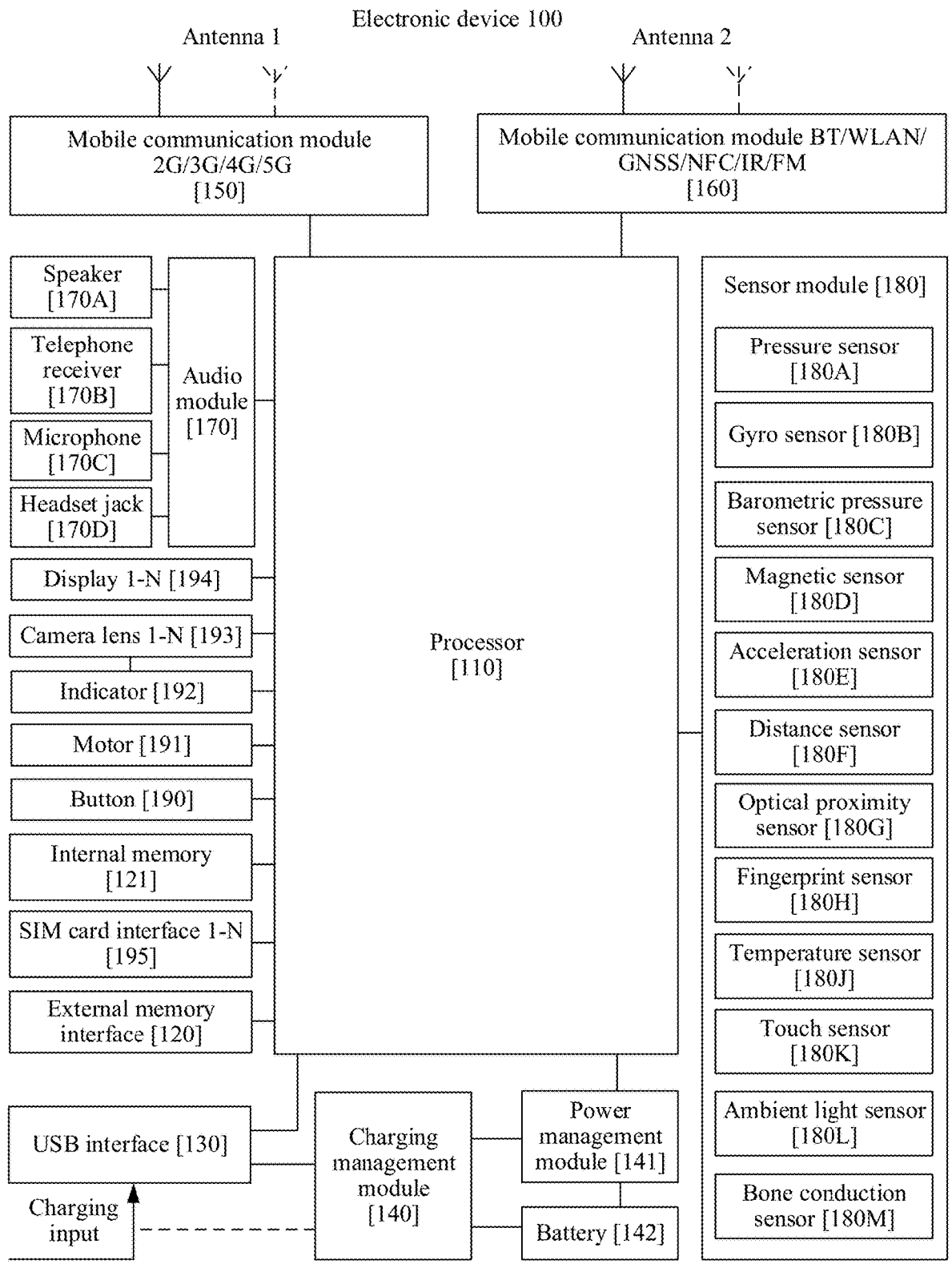
FIG. 4 is a schematic diagram of a structure of an electronic device according to an embodiment of this application.

For example, FIG. 4 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera lens 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application constitutes no specific limitation on the electronic device 100. In some other embodiments of this application, the electronic device 100 may include more or fewer components than those shown in the figure, some components may be combined, some components may be split, or different component arrangements may be used. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video encoder and decoder, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that has been used or cyclically used by the processor 110. If the processor 110 needs to use the instructions or data again, the processor 110 may directly call the instructions or data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera lens 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is typically configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing back music through a Bluetooth headset.

The MIPI interface may be configured to connect the processor 110 and peripheral components such as the display 194 and the camera lens 193. The MIPI interface includes a camera serial interface (camera serial interface, CSI), a display serial interface (display serial interface, DSI), and the like. In some embodiments, the processor 110 communicates with the camera lens 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 and the camera lens 193, the display 194, the wireless communication module 160, the audio module 170, the sensor module 180, or the like. The GPIO interface may alternatively be configured as an I2C interface, an I2S interface, a UART interface, an MIPI interface, or the like.

A USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to perform data transmission between the electronic device 100 and a peripheral device, or may be configured to connect to a headset to play audio through the headset. The interface may be further configured to connect to another electronic device such as an AR device.

It may be understood that an interface connection relationship between the modules shown in embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger or a wired charger. In some embodiments of wired charging, the charging management module 140 may receive charging input from a wired charger through the USB interface 130. In some embodiments of wireless charging, the charging management module 140 may receive a wireless charging input through a wireless charging coil of the electronic device 100. The charging management module 140 may supply power for the electronic device by using the power supply management module 141 while charging the battery 142.

The power supply management module 141 is configured to connect to the battery 142, the charging management module 140, and the processor 110. The power supply management module 141 receives an input from the battery 142 and/or the charging management module 140, and supplies power to the processor 110, the internal memory 121, the external memory, the display 194, the camera lens 193, the wireless communication module 160, and the like. The power supply management module 141 may be further configured to listen to parameters such as a battery capacity, a battery cycle count, and a battery health state (electric leakage or impedance). In some other embodiments, the power supply management module 141 may alternatively be arranged in the processor 110. In some other embodiments, the power supply management module 141 and the charging management module 140 may be disposed on a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. The structures of an antenna 1 and an antenna 2 in FIG. 4 are just an example. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the telephone receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another function module.

The wireless communication module 160 may provide wireless communication solutions applicable to the electronic device 100, including a WLAN (for example, a (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC), an infrared (infrared, IR) technology, and the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 are coupled, and the antenna 2 and the wireless communication module 160 in the electronic device 100 are coupled, so that the electronic device 100 can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include 1 or N displays 194, where N is a positive integer greater than 1.

The electronic device 100 may implement a photographing function through the camera lens 193, the ISP, the video encoder and decoder, the GPU, the display 194, the application processor, and the like.

The ISP is configured to process data fed back by the camera lens 193. For example, during photographing, a shutter is pressed, and light is transmitted to a photosensitive element of the camera lens through a lens. An optical signal is converted into an electrical signal, and the photosensitive element of the camera lens transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera lens 193.

The camera lens 193 is configured to capture a still image or a video. An optical image of an object is generated through the lens, and is projected onto the photosensitive element. The photosensitive element may be a charge coupled device (charge coupled device, CCD), or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N camera lenses 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video encoder and decoder is configured to compress or decompress a digital video. The electronic device 100 may support one or more types of video encoder and decoders. Therefore, the electronic device 100 may play or record videos in a plurality of encoding formats, such as moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transfer between human brain neurons, and may further continuously perform self-learning. The NPU may implement applications such as intelligent cognition of the electronic device 100, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music play and recording, by using the audio module 170, the speaker 170A, the telephone receiver 170B, the microphone 170C, the headset jack 170D, the application processor, and the like.

The audio module 170 is configured to convert digital audio information into analog audio signal output, and is further configured to convert analog audio input into a digital audio signal. The audio module 170 may be further configured to code and decode an audio signal. In some embodiments, the audio module 170 may be disposed in the processor 110, or some functional modules in the audio module 170 may be disposed in the processor 110.

The speaker 170A, also referred to as a "horn", is configured to convert an audio electrical signal into a sound signal. The electronic device 100 may listen to music or answer a hands-free call by using the speaker 170A.

The telephone receiver 170B, also referred to as an "earpiece", is configured to convert an audio electrical signal into a sound signal. When the electronic device 100 answers a call or receives voice information, the telephone receiver 170B may be placed close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be arranged in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunication industry association of the USA (cellular telecommunication industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 180A. The electronic device 100 determines an intensity of the pressure based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on a short message application icon, an instruction for viewing a short message is performed. When a touch operation whose touch operation intensity is greater than or equal to the first pressure threshold is performed on the short message application icon, an instruction for creating a new short message is performed.

The gyro sensor 180B may be configured to determine a motion posture of the electronic device 100. In some embodiments, angular velocities of electronic device 100 around three axes (which are x, y, and z axes) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may further be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light through the light-emitting diode. The electronic device 100 uses the photodiode to detect reflected infrared light from a nearby object. When sufficient reflected light is detected, it may be determined that an object exists near the electronic device 100. When insufficient reflected light is detected, the electronic device 100 may determine that no object exists near the electronic device 100. The electronic device 100 may detect, by using the optical proximity sensor 180G, that the user holds the electronic device 100 close to an ear for a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption and implement thermal protection. In some other embodiments, when the temperature is less than another threshold, the electronic device 100 heats the battery 142, to prevent the electronic device 100 from being abnormally powered off due to the low temperature. In some other embodiments, when the temperature is lower than still another threshold, the electronic device 100 boosts an output voltage of the battery 142 to prevent an abnormal shutdown caused by the low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 100, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be in contact with a human pulse, to receive a blood pressure pulse signal. In some embodiments, the bone conduction sensor 180M may alternatively be disposed in a headset to be combined into a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure pulse signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be used for an incoming call vibration alert or a touch vibration feedback. For example, touch operations performed on different applications (for example, photographing and audio playback) may correspond to different vibration feedback effects. The motor 191 may also correspond to different vibration feedback effects for touch operations applied to different regions of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging state and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device 100. The electronic device 100 may support 1 or N SIM card interfaces, N being a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network via a SIM card, thereby implementing functions such as making/answering a call and data communication. In some embodiments, the electronic device 100 uses an eSIM, namely, an embedded SIM card. The eSIM card may be embedded in the electronic device 100 and cannot be separated from the electronic device 100.

A software system of the electronic device 100 may use a layered architecture, an event-driven architecture, a micro-kernel architecture, a microservices-based architecture, or a cloud architecture. In embodiments of this application, an Android system with a layered architecture is used as an example to describe a software structure of the electronic device 100.

Figure 5:
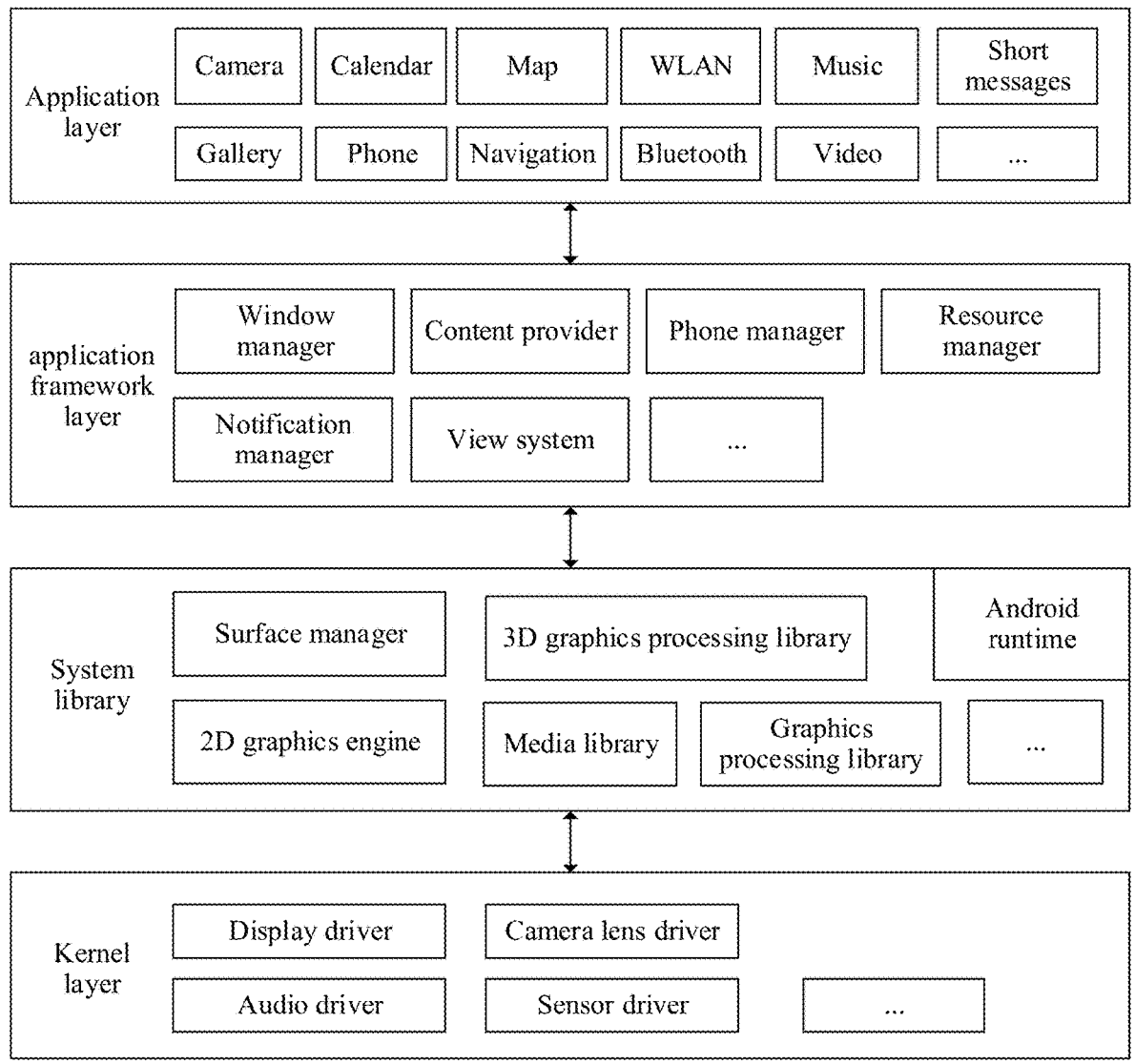
FIG. 5 is a block diagram of a software structure of an electronic device according to an embodiment of this application.

FIG. 5 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 5, the application packages may include applications such as a camera, a gallery, a calendar, a phone, a map, navigation, a WLAN, Bluetooth, music, a video, and a short message.

The application framework layer provides an application programming interface (application programming interface, API) and a programming framework for an application at the application layer. The application framework layer includes some predefined functions.

As shown in FIG. 5, the application framework layer may include a window manager, a content provider, a view system, a phone manager, a resource manager, a notification manager, and the like.

The window manager is configured to manage a window program. The window manager may obtain a size of a display, determine whether there is a state bar, perform screen locking, take a screenshot, and the like.

The content provider is configured to: store and obtain data, and enable the data to be accessed by an application. The data may include a video, an image, audio, outgoing and incoming calls, a browsing history and bookmarks, contacts, and like.

The view system includes visual controls such as a control for displaying text and a control for displaying a picture. The view system may be configured to construct an application. A display interface may include one or more views. For example, a display interface including a short message service message notification icon may include a view for displaying text and a view for displaying a picture.

The phone manager is configured to provide a communication function for the electronic device 100, for example, management of a call state (including answering, declining, or the like).

The resource manager provides various resources such as a localized character string, an icon, a picture, a layout file, and a video file for an application.

The notification manager enables an application to display notification information in a state bar, and may be configured to convey a notification message that may automatically disappear after a short pause without requiring user interaction. For example, the notification manager is configured to notify download completion, message notification, or the like. The notification manager may alternatively be a notification that appears in a top state bar of the system in a form of a graph or a scroll bar text, for example, a notification of an application that is run on a background, or may be a notification that appears on a screen in a form of a dialog window. For example, text information is displayed in the state bar, a prompt tone is made, the electronic device vibrates, or the indicator light flashes.

The Android runtime includes a kernel library and a virtual machine. The Android Runtime is responsible for scheduling and management of the Android system.

The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is configured to enable a function such as object life cycle management, stack management, thread management, security and exception management, and garbage collection.

The system library may include a plurality of functional modules, for example, a surface manager (surface manager), a media library (media libraries), a 3D graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, PNG, and the like.

The 3D graphics processing library is configured to implement 3D graphics drawing, image rendering, compositing, layer processing, and the like.

The 2D graphics engine is a drawing engine for 2D drawing.

The kernel layer is a layer between hardware and software. The kernel layer includes at least a display driver, a camera lens driver, an audio driver, and a sensor driver.

For ease of understanding, in the following embodiments of this application, an electronic device having the structures shown in FIG. 4 and FIG. 5 is used as an example, and a screen projection method for the electronic device provided in an embodiment of this application is specifically described with reference to accompanying drawings.

Figure 6:
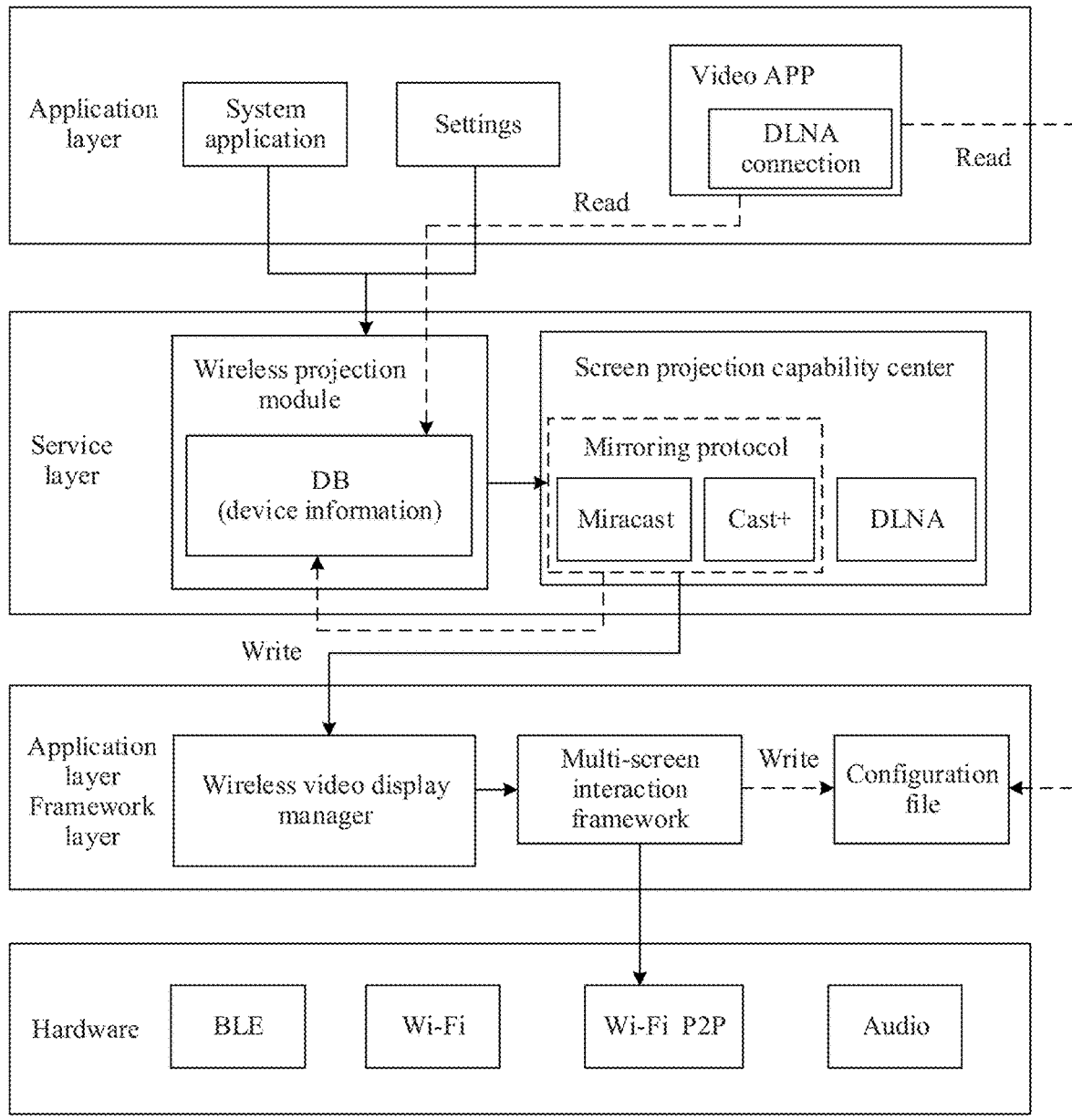
FIG. 6 is a schematic diagram of a system architecture of a screen projection method for an electronic device according to an embodiment of this application.

The screen projection method for the electronic device provided in this embodiment of this application may be applied to a system architecture shown in FIG. 6. A processing procedure provided in this embodiment of this application is described below with reference to FIG. 6.

Figure 1B:
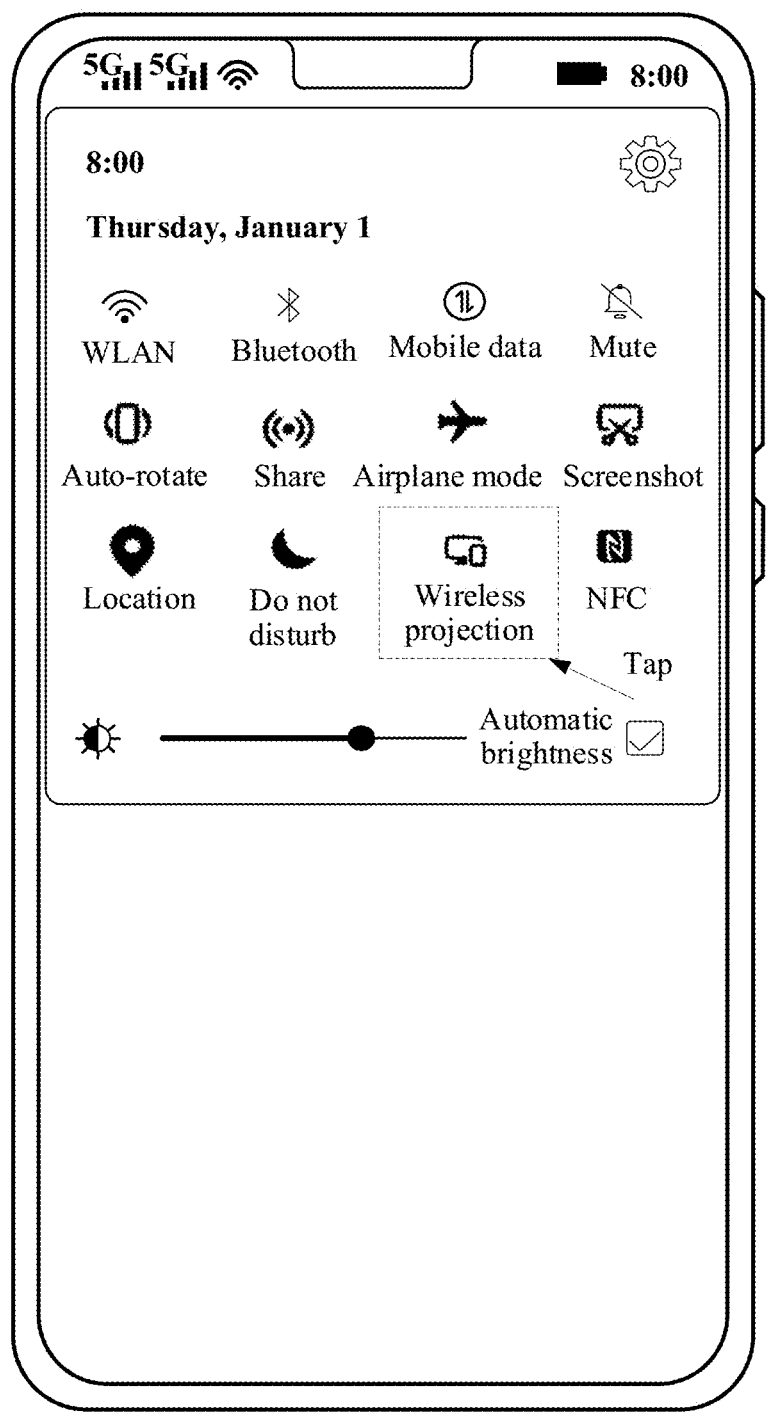
FIG. 1B is a schematic diagram of a system drop-down menu according to an embodiment of this application.
Figure 1C:
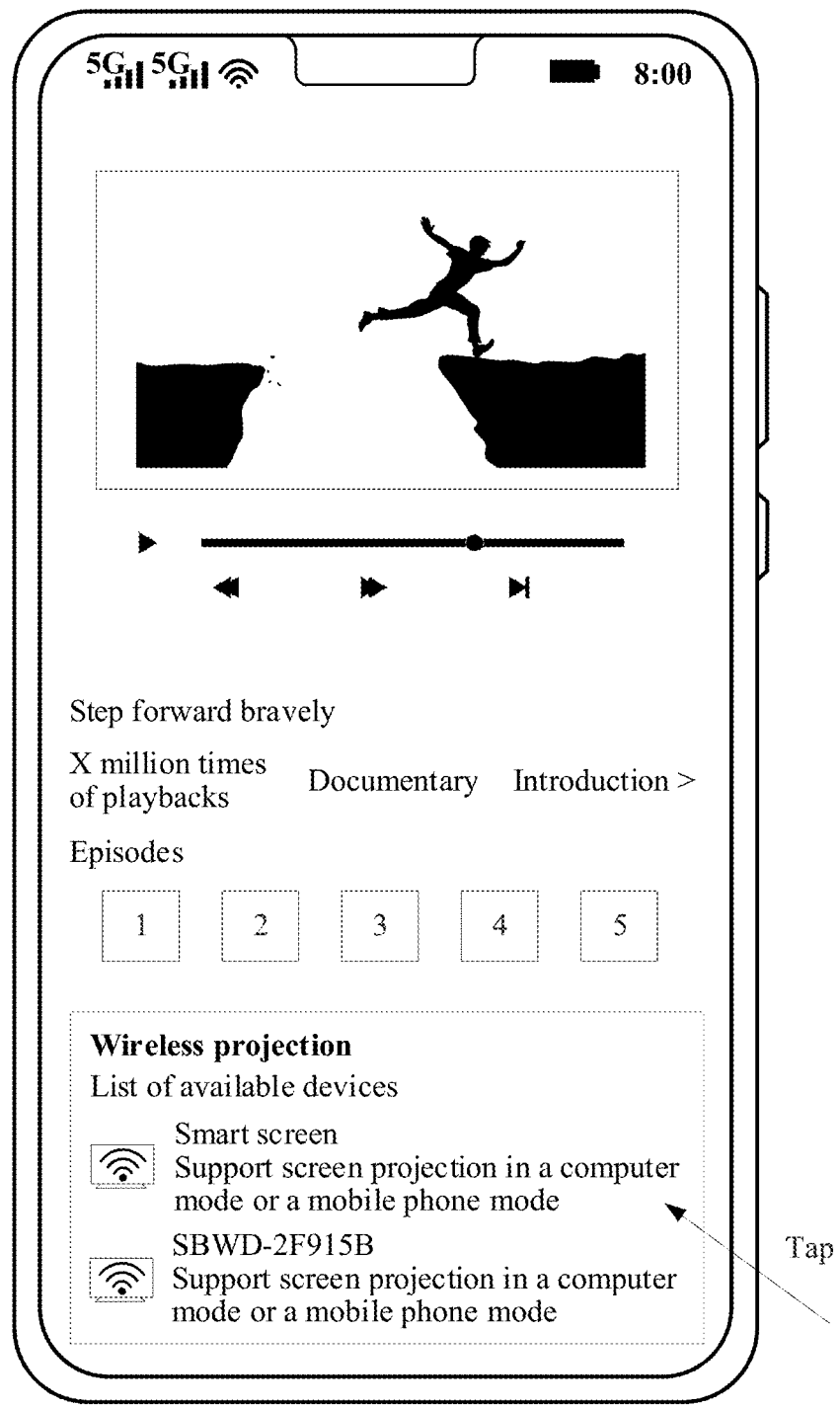
FIG. 1C is a schematic diagram of a display interface of a list of available devices according to an embodiment of this application.
Figure 1D:
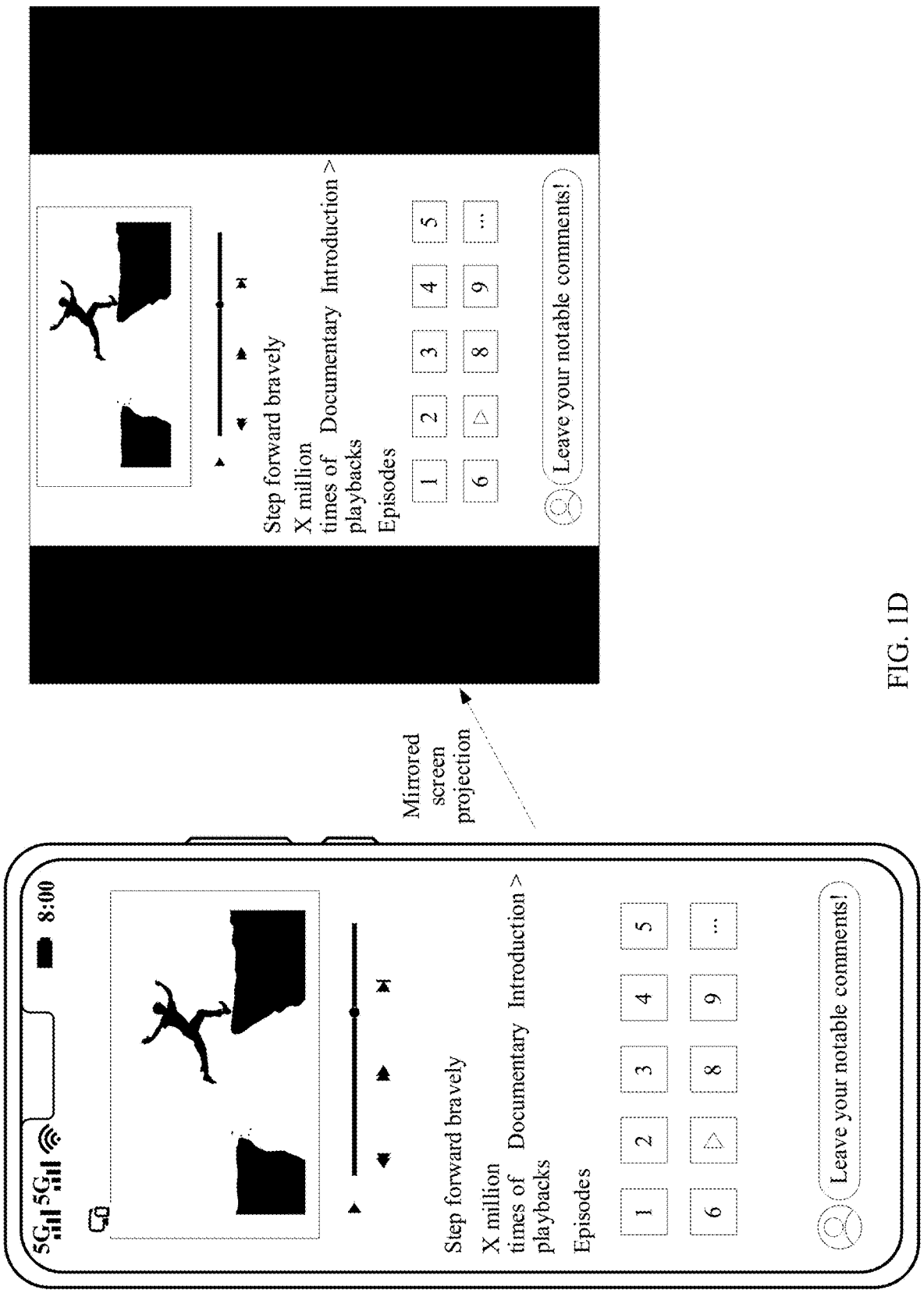
FIG. 1D is a schematic diagram of comparison between display effect of an electronic device and display effect of a screen projection device according to an embodiment of this application.
Figure 2A:
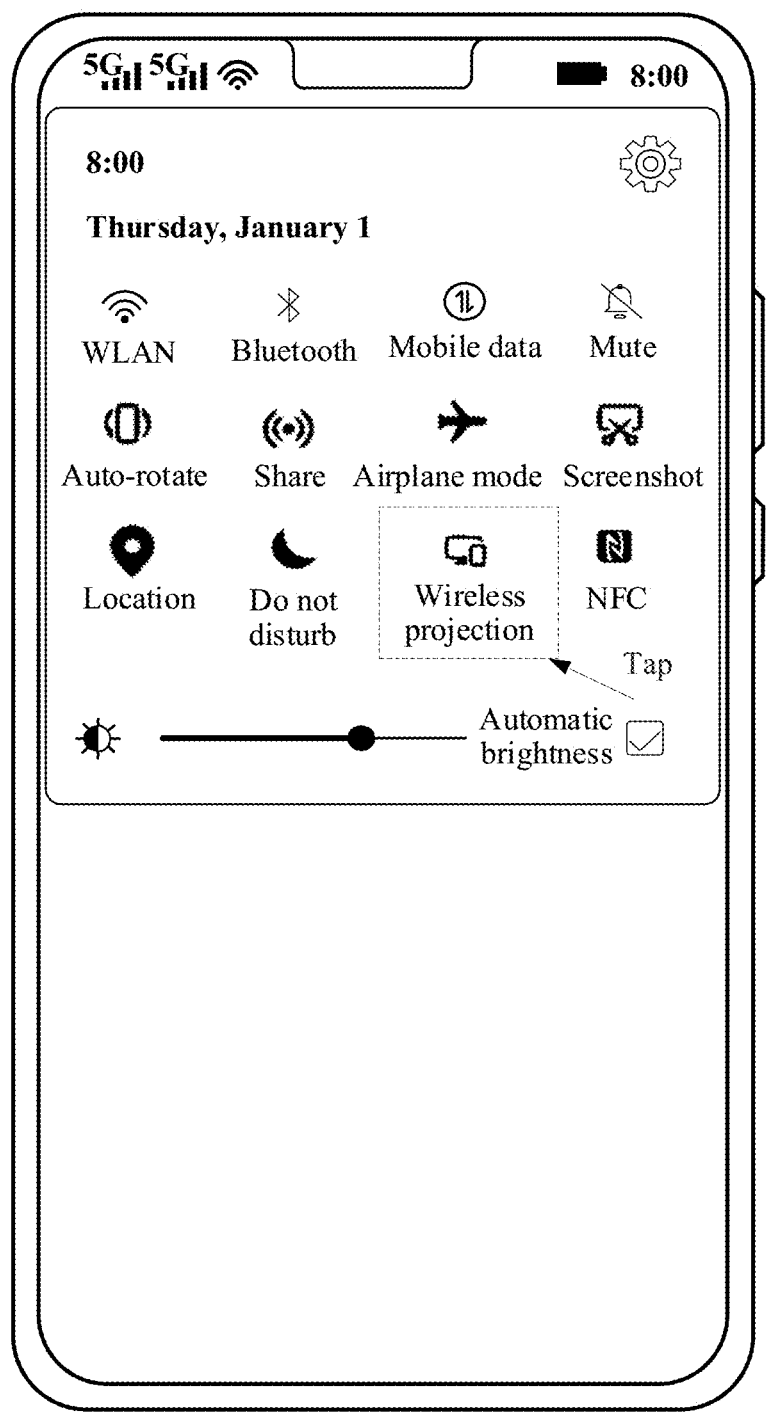
FIG. 2A is a schematic diagram of another system drop-down menu according to an embodiment of this application.
Figure 2B:
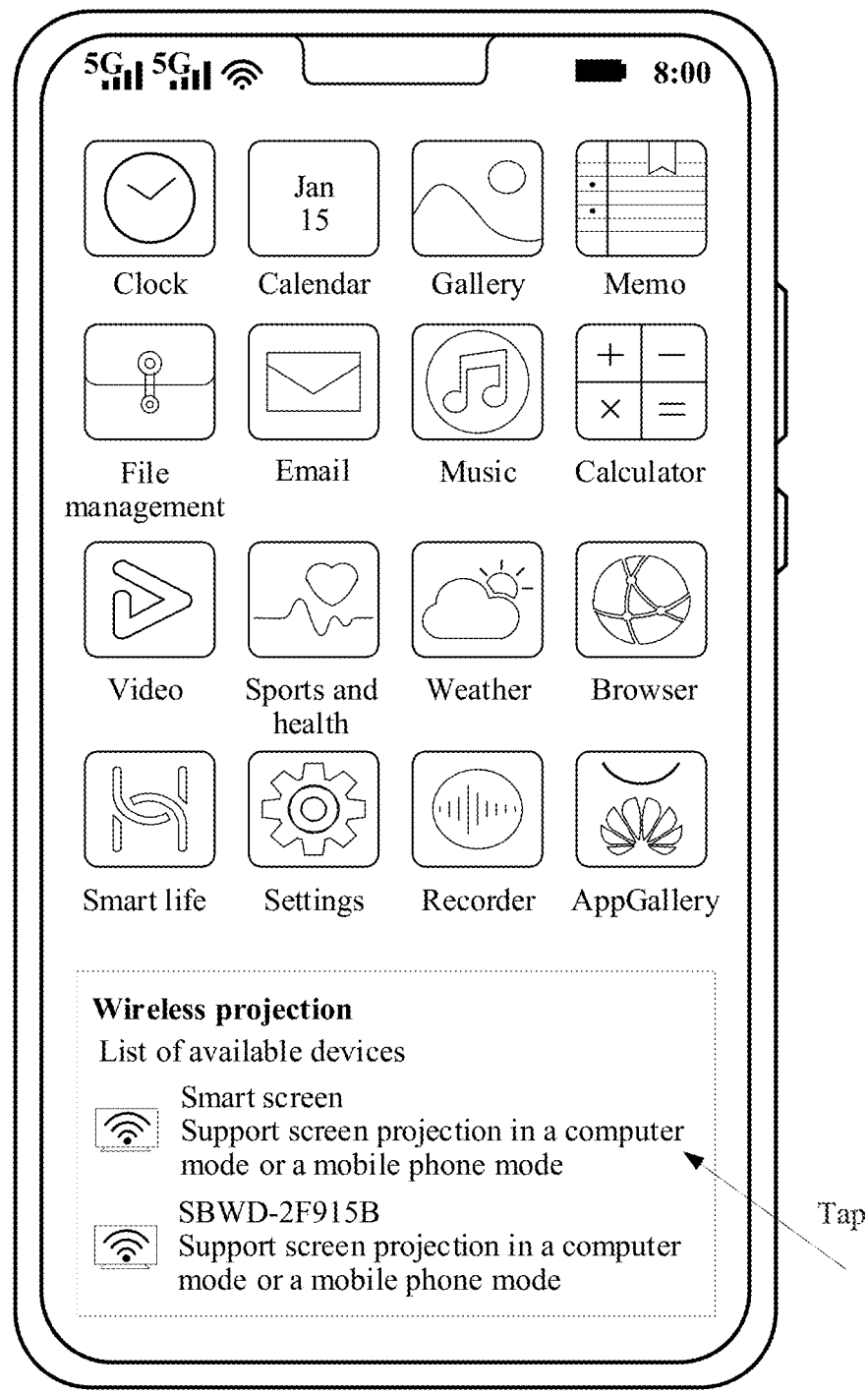
FIG. 2B is a schematic diagram of another display interface of a list of available devices according to an embodiment of this application.
Figure 2C:
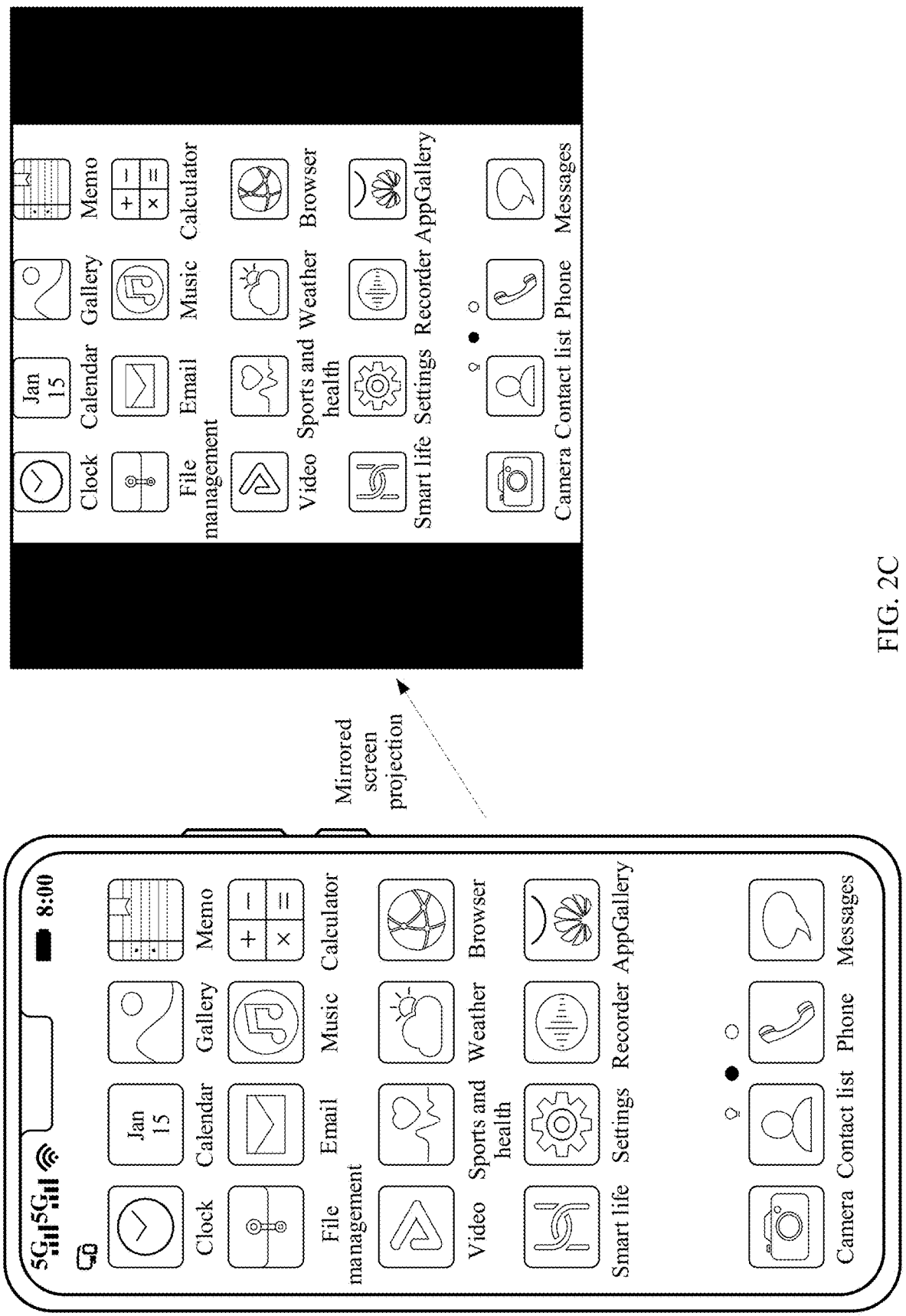
FIG. 2C is a schematic diagram of another comparison I between display effect of an electronic device and display effect of a screen projection device according to an embodiment of this application.
Figure 2D:
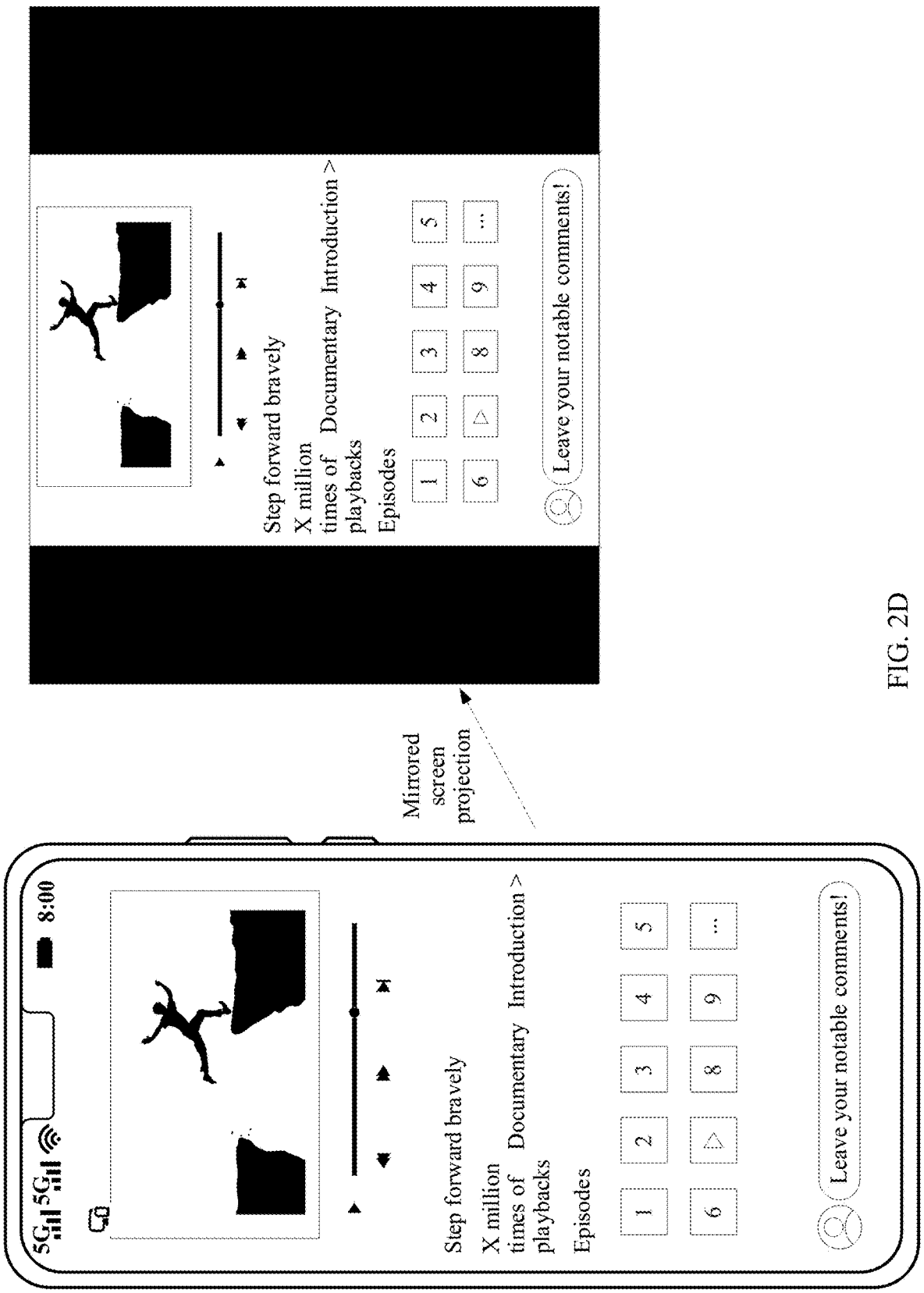
FIG. 2D is a schematic diagram of still another comparison II between display effect of an electronic device and display effect of a screen projection device according to an embodiment of this application.

First, SystemUI runs in a form of system application in an Android system, FIG. 1B and FIG. 2A show one function of quick settings (quick settings) among functions that are implemented by SystemUI. After a user taps a "wireless projection" key in FIG. 1B or FIG. 2A (or finds a "wireless projection" key through a "settings" path of the electronic device), the electronic device may send the tapping instruction to a wireless projection module in a service layer. The wireless projection module searches for a screen projection device through a mirroring protocol provided by a screen projection capability center, for example, through a Miracast protocol, and then invokes a wireless video display manager Wi-FiDisplay in an application framework layer, and determines to connect to a Wi-Fi P2P screen projection device through a multi-screen interaction framework. After a connection between the electronic device and the screen projection device is established, a data stream of a display interface may be pushed to the screen projection device for display, a state identifier indicating that the mirrored screen projection has been enabled may be written into a configuration file Settings, and device information of a connected screen projection device may be written into a database SQLite (Database), referred to as a DB. Optionally, the state identifier and the device information may also be written into another storable file. A storage method is not limited in this embodiment of this application. Then, if a third-party video APP is playing back a video, the video APP reads the state identifier in Settings and the device information in the DB through an interface provided by a system. When the read state identifier is that the mirrored screen projection has been enabled and device information of a connected device is included in the DB, the video APP invokes a DLNA interface in the system, to switch from the mirrored screen projection to DLNA screen projection, and sends information that the DLNA screen projection is successfully connected to the wireless projection module. It may be understood that the device information in the DB may include, but is not limited to, an IP address, a MAC address, a UUID, a device identifier, a device name, and the like of the screen projection device. Usually, video data for the mirrored screen projection is in a format of H264 video encoding, and video data for the DLNA screen projection is in a format of x264 video encoding.

When the wireless projection module searches for the screen projection device through the mirroring protocol, a mirroring protocol corresponding to a device that currently supports screen projection may be selected based on a capability of the device. Popular mirroring protocols at present include a Miracast protocol, a Cast+ protocol, an AirPlay protocol, a Lelink protocol, and the like.

Specifically, Miracast is a wireless display standard that is developed by the Wi-Fi Alliance in 2012 based on a Wi-Fi Direct (Wi-Fi Direct) connection. A device that performs wireless projection through the Miracast protocol is not to be accessed to a wireless local area network, and the electronic device may directly play a video or a photo on the screen projection device through the protocol without any connecting cable and without being accessed to an access point (access point, AP). In a Miracast application scenario, a smartphone that supports P2P may be directly connected to a smart television that supports P2P. Therefore, the smartphone may transfer a screen or a media resource of the smartphone to a smart television for display or playback. The Cast+ protocol may support wireless projection of an electronic device having a specific brand A, and a low packet loss is low during transmission of audio and video data. The AirPlay protocol is a wireless display standard based on Wi-Fi, may be applied between an electronic device having a specific brand B and the screen projection device, and may support a push mode and a mirroring mode. A device that performs wireless projection through the Lelink protocol is to be connected to a same wireless local area network.

Figure 7A:
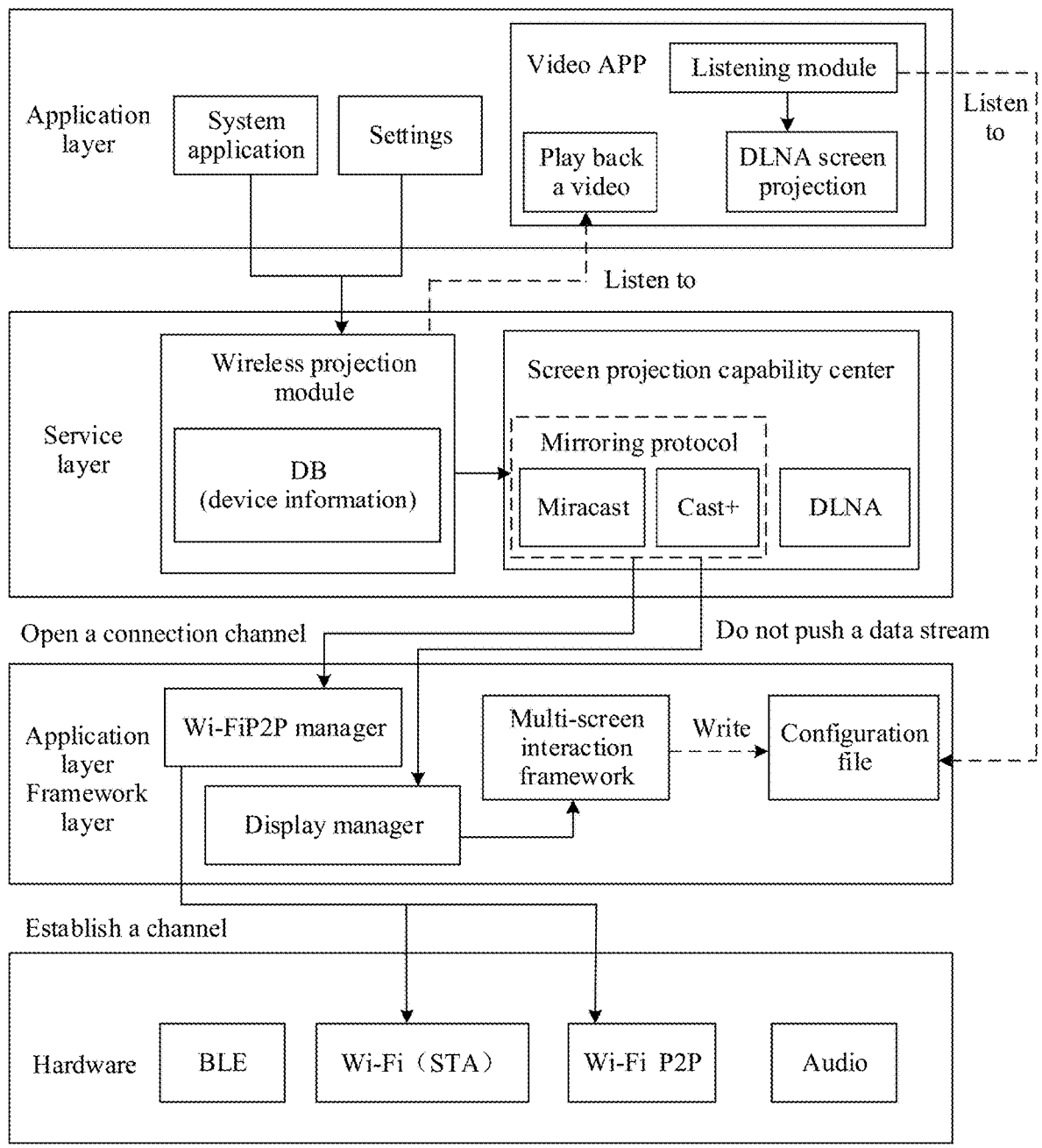
FIG. 7A is a schematic diagram of another system architecture of a screen projection method for an electronic device according to an embodiment of this application.

The screen projection method for the electronic device provided in this embodiment of this application may further be applied to a system architecture shown in FIG. 7. A processing procedure provided in this embodiment of this application is described below with reference to FIG. 7.

First, when a third-party video APP is playing back a video, a user taps a "wireless projection" key in FIG. 1B or FIG. 2A (or finds a "wireless projection" key through a "settings" path of the electronic device). Then, if a wireless projection module in a service layer listens and obtains that the video APP is playing back a video, a screen projection device may be searched through a mirroring protocol provided by the screen projection capability center, for example, through the Miracast protocol. In this case, the screen projection capability center opens a connection channel of a P2P or a WLAN, establishes a channel connected to a Wi-Fi P2P screen projection device by using Wi-FiP2PManager manager, or establishes a channel connected to a Wi-Fi (STA) screen projection device. In an implementation, as shown FIG. 7A, after the channel is established, the screen projection capability center does not push a data stream to display manager DisplayManager. However, a multi-screen interaction framework still writes a state identifier indicating that the mirrored screen projection has been enabled into a configuration file Settings, and writes device information of a connected screen projection device into the DB. Then, if the third-party video APP listens and obtains that the mirrored screen projection of the electronic device has been enabled, the third-party video APP invokes an internal DLNA interface in a system for the DLNA screen projection.

Figure 7B:
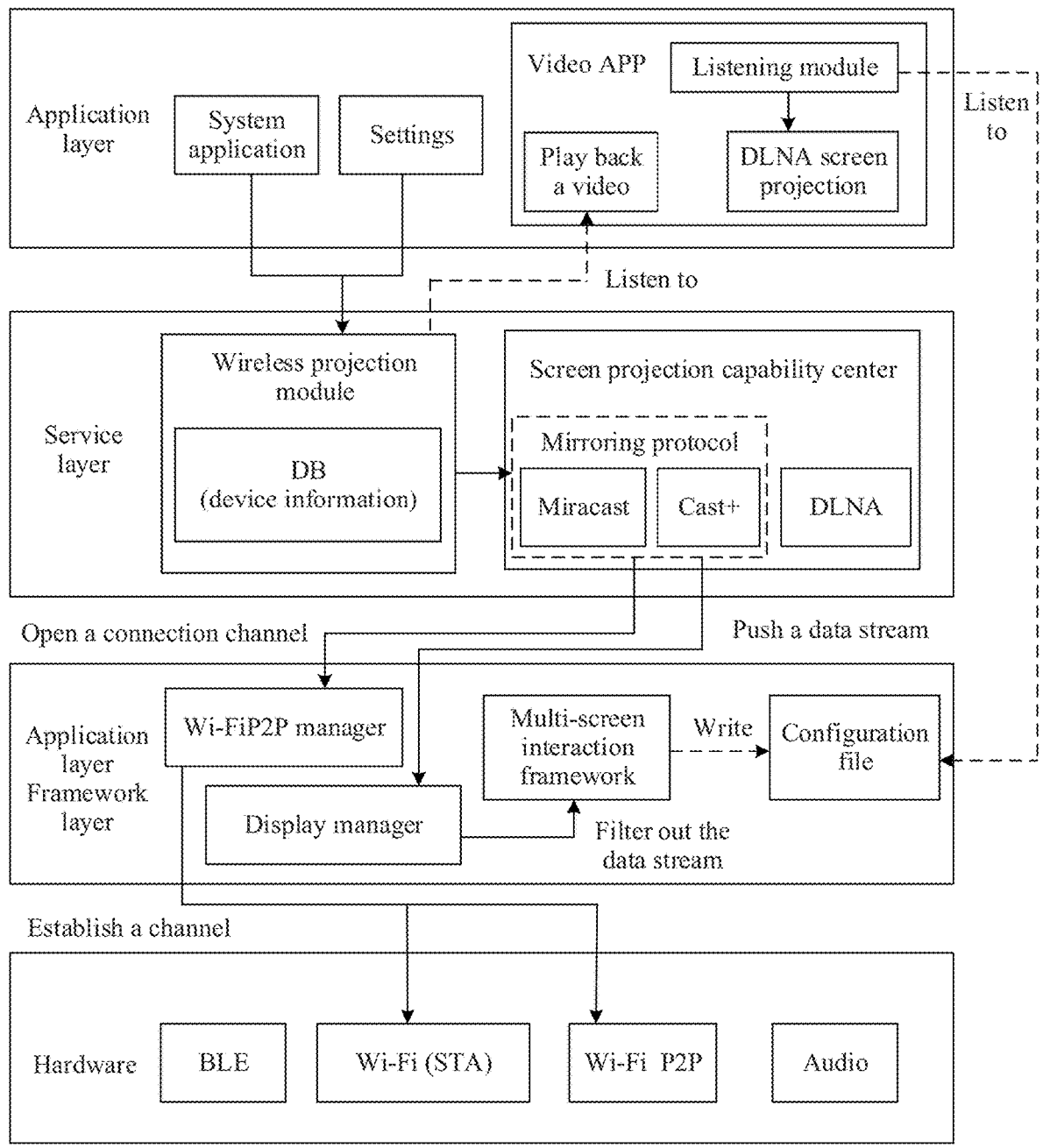
FIG. 7B is a schematic diagram of still another system architecture of a screen projection method for an electronic device according to an embodiment of this application.

In another implementation, as shown in FIG. 7B, after the channel is established, the screen projection capability center pushes the data stream to DisplayManager, but DisplayManager filters out the data stream. In other words, the data stream is not displayed on the screen projection device. Then, the multi-screen interaction framework writes, into a configuration file Settings, a state identifier indicating that the mirrored screen projection has been enabled, and writes device information of a connected screen projection device into the DB. If the third-party video APP listens and obtains that the mirrored screen projection of the electronic device has been enabled, the third-party video APP invokes a DLNA interface in a system for the DLNA screen projection.

In conclusion, in this embodiment of this application, because of the foregoing problems such as black borders appearing on an image on the screen projection device during the mirrored screen projection, after the mirrored screen projection is enabled, the mirrored screen projection may be automatically switched to the DLNA screen projection by the video APP by invoking the internal DLNA interface. When the electronic device is projected through the DLNA screen projection, because an address (such as a uniform resource locator (uniform resource locator, URL)) of audio and video data that is played back may be pushed to the screen projection device, the screen projection device may download a data resource based on the address of the audio and video data of the screen projection device, to play in full screen. This may resolve problems such as the black borders, freezing, screen distortion, and audio-visual unsynchronization on an image. A video image that is played back is clear and smooth. This effectively improves screen projection effect, and improves user experience without another operation performed by the user. In addition, when the DLNA screen projection mode is used, the user may perform another operation on the electronic device without affecting normal playback of a video by the screen projection device.

Figure 8:
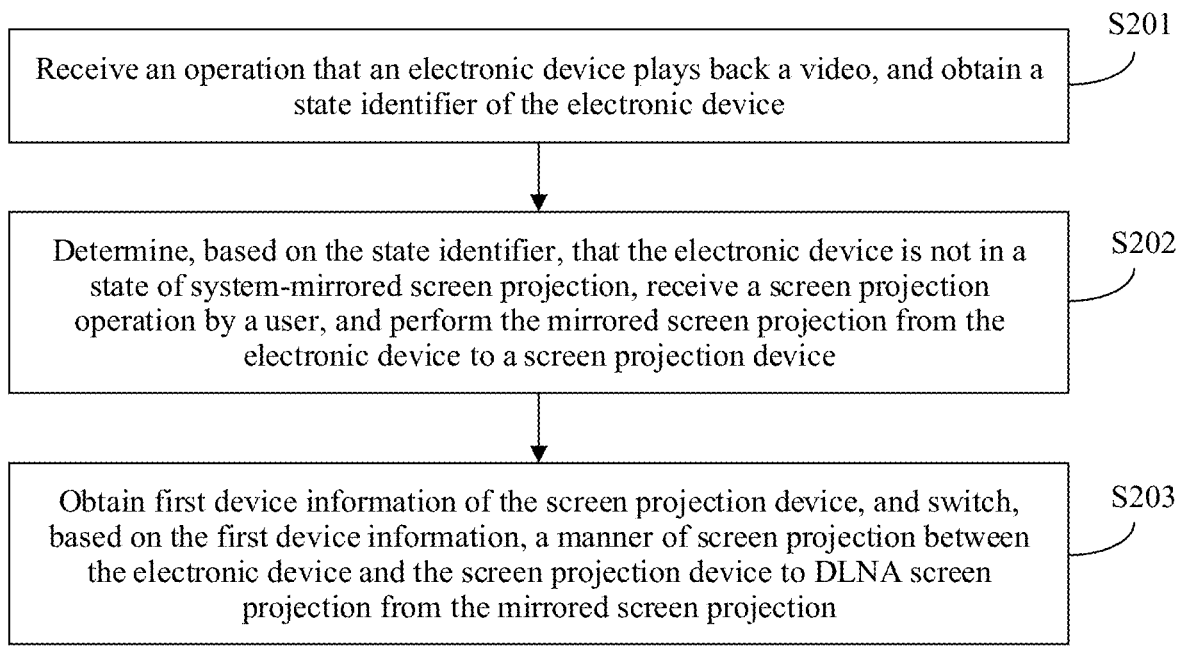
FIG. 8 is a schematic flowchart of a screen projection method for an electronic device according to an embodiment of this application.

An implementation process of a scenario shown in FIG. 1 is introduced first, that is, a scenario in which the electronic device first plays back a video first, and then enables the mirrored screen projection may be implemented with reference to the system architecture shown in FIG. 6. FIG. 8 is a schematic flowchart of a screen projection method for an electronic device according to an embodiment of this application. The method includes the following steps.

S201: Receive an operation that the electronic device plays back a video, and obtain a state identifier of the electronic device.

When the electronic device is in a state of mirrored screen projection, the state identifier may be 1. When the electronic device is not in the state of the mirrored screen projection, the state identifier may be 0.

S202: Determine, based on the state identifier, that the electronic device is not in the state of the mirrored screen projection, receive a screen projection operation by a user, and perform the mirrored screen projection from the electronic device to a screen projection device.

Specifically, when the electronic device is not in the state of the mirrored screen projection (that is, the state identifier is 0), if a video APP in the electronic device starts to play back a video, screen projection may not be performed on the screen projection device. In this case, the user is to enable a function of the mirrored screen projection (that is, a screen projection operation).

When the user enables the function of the mirrored screen projection, the electronic device may search for a device through a mirroring protocol. When the electronic device searches for only one screen projection device, a display interface may be directly projected to the screen projection device in a mirroring mode. When searching for a plurality of screen projection devices, the electronic device may display a list of available devices to the user, such as a display interface shown in FIG. 1C. Then, after receiving a selection operation of the user, the electronic device projects the display interface to the screen projection device that is selected by the user. When the screen projection device searched by the electronic device is a screen projection device that had been previously selected by the user, the display interface may also be directly projected to the screen projection device. It may be understood that, after the display interface of the electronic device is projected to the screen projection device, the electronic device may record a state identifier indicating that the mirrored screen projection has been enabled and device information of a connected screen projection device.

S203: Obtain first device information of the screen projection device, and switch, based on the first device information, a manner of screen projection between the electronic device and the screen projection device to DLNA screen projection from the mirrored screen projection.

Specifically, after the electronic device is in the state of the mirrored screen projection, the video APP may obtain the device information of the screen projection device, and invoke an internal DLNA interface to switch the manner of screen projection between the electronic device and the screen projection device to the DLNA screen projection from the mirrored screen projection. Before the video APP invokes the internal DLNA interface, the electronic device is to search for a nearby device that supports the DLNA screen projection through a DLNA protocol. When a device that supports the DLNA screen projection and a screen projection device that supports the mirrored screen projection are a same device, the video APP may invoke the DLNA interface to implement the DLNA screen projection. It should be noted that a device that performs wireless projection through the DLNA protocol is to be connected to a same wireless local area network.

For this process, it may be learned from the manner in which a video is watched in the mode of the mirrored screen projection of the electronic device shown in FIG. 1, that, in the manner, the electronic device plays back the video first, and then enables the mirrored screen projection. For this manner, the following describes a process of switching to the DLNA screen projection. Refer to FIG. 9(a). In a process in which a video APP in the electronic device plays back a video, if a current electronic device does not enable the function of the mirrored screen projection, the video APP starts a listening module ContentObserver to listen to data in the foregoing Settings (that is, when the video APP plays back the video, it is listened to whether the electronic device is in the state of the mirrored screen projection). When it is listened and obtained that the state identifier in Settings indicates that the mirrored screen projection has been enabled, to be specific, in this case, the mirrored screen projection from the electronic device to the screen projection device has been performed, and the video APP is also playing back the video, the video APP obtains the device information of the connected screen projection device from the DB, and switches a manner of screen projection between the electronic device and the screen projection device to the DLNA screen projection from the mirrored screen projection. In addition, the ContentObserver may also listen to whether the mirrored screen projection between the electronic device and the screen projection device is disconnected, for example, after the electronic device is disconnected from the mirrored screen projection, the video APP listens and obtains a disconnection message and invokes the internal DLNA interface to disconnect from the DLNA screen projection.

In the foregoing screen projection method for the electronic device, when the electronic device plays back the video, if the electronic device is not currently in the state of the system-mirrored screen projection, the electronic device may receive an operation that the user enables a function of the system-mirrored screen projection, and the mirrored screen projection to the DLNA screen projection is performed. This may resolve problems such as black borders, freezing, screen distortion, and audio-visual unsynchronization on an image. A video image that is played back is clear and smooth. This effectively improves screen projection effect, and improves viewing experience of the user without another operation performed by the user.

Figure 10:
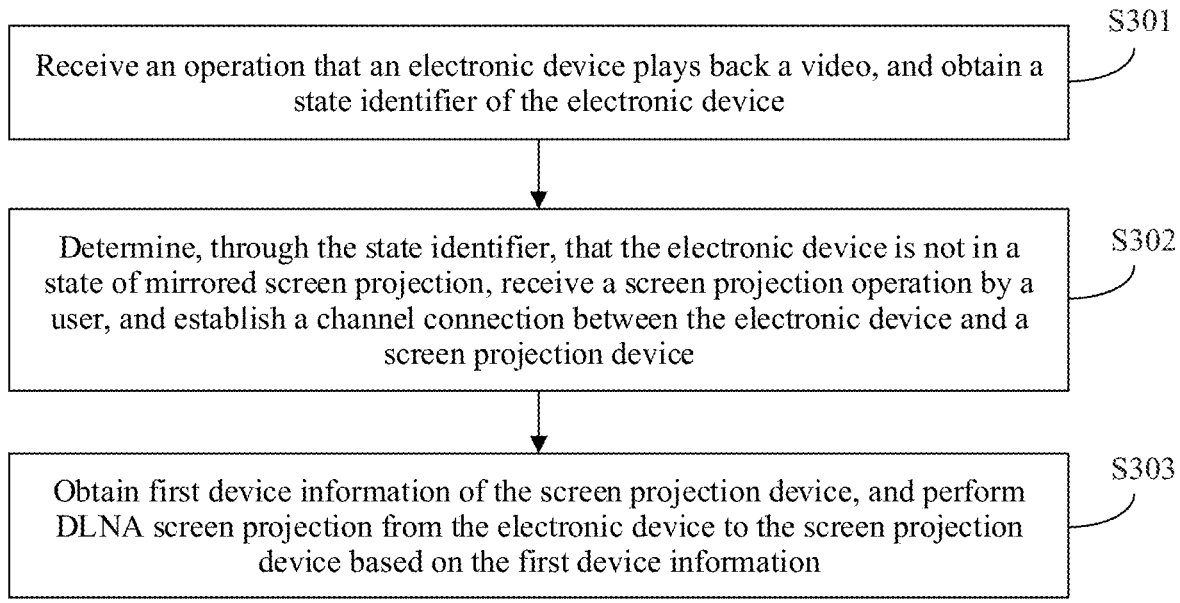
FIG. 10 is a schematic flowchart of another screen projection method for an electronic device according to an embodiment of this application.

The scenario in FIG. 1 may also be implemented with reference to the system architecture shown in FIG. 7. FIG. 10 is a schematic flowchart of another screen projection method for an electronic device according to an embodiment of this application. The method includes the following steps.

S301: Receive an operation that the electronic device plays back a video, and obtain a state identifier of the electronic device.

For an implementation process of S301, refer to the process in S201. Details are not described herein.

S302: Determine, based on the state identifier, that the electronic device is not in a state of mirrored screen projection, receive a screen projection operation by a user, and establish a channel connection between the electronic device and a screen projection device.

Specifically, when the electronic device is not in the state of the mirrored screen projection, if the video APP in the electronic device starts to play back the video, screen projection may not be performed on the screen projection device. In this case, the user is to enable a function of the mirrored screen projection (that is, perform a screen projection operation).

When the user enables the function of the mirrored screen projection, the electronic device may search for a device through a mirroring protocol, and establish a channel connection between the electronic device and the screen projection device after finding the screen projection device. In an implementation, only the channel connection is established between the electronic device and the screen projection device, and no data stream is pushed to the screen projection device. In another implementation, the channel connection is established between the electronic device and the screen projection device, and a data stream is pushed to the screen projection device. However, the screen projection device filters out the data stream. That is, in this implementation, a mirrored screen projection interface of the electronic device is not displayed on the screen projection device.

It may be understood that, after the channel connection is established between the electronic device and the screen projection device, a state identifier indicating that the mirrored screen projection has been enabled and device information of a connected screen projection device may be recorded.

S303: Obtain first device information of the screen projection device, and perform the DLNA screen projection from the electronic device to the screen projection device based on the first device information.

Specifically, the video APP may listen to whether the electronic device is in the state of the mirrored screen projection. When it is listened and obtained that the mirrored screen projection has been enabled, the video APP obtains the device information of the screen projection device, and invokes an internal DLNA interface. Therefore, in this case, when the mirrored screen projection from the electronic device to the screen projection device is not performed, the DLNA screen projection from the electronic device to the screen projection device may be performed. In this case, no process of switching from the mirrored screen projection to the DLNA screen projection is provided to the user in viewing experience.

According to the foregoing screen projection method for the electronic device, when the electronic device plays back the video, if the electronic device is not currently in the state of the system-mirrored screen projection, the electronic device may receive an operation that the user enables the function of the system-mirrored screen projection, and projection to the screen projection device is performed directly in a manner of the DLNA screen projection. This may resolve problems such as black borders, freezing, screen distortion, and audio-visual unsynchronization on an image. A video image that is played back is clear and smooth. This effectively improves screen projection effect, and improves viewing experience of the user without another operation performed by the user.

Figure 11:
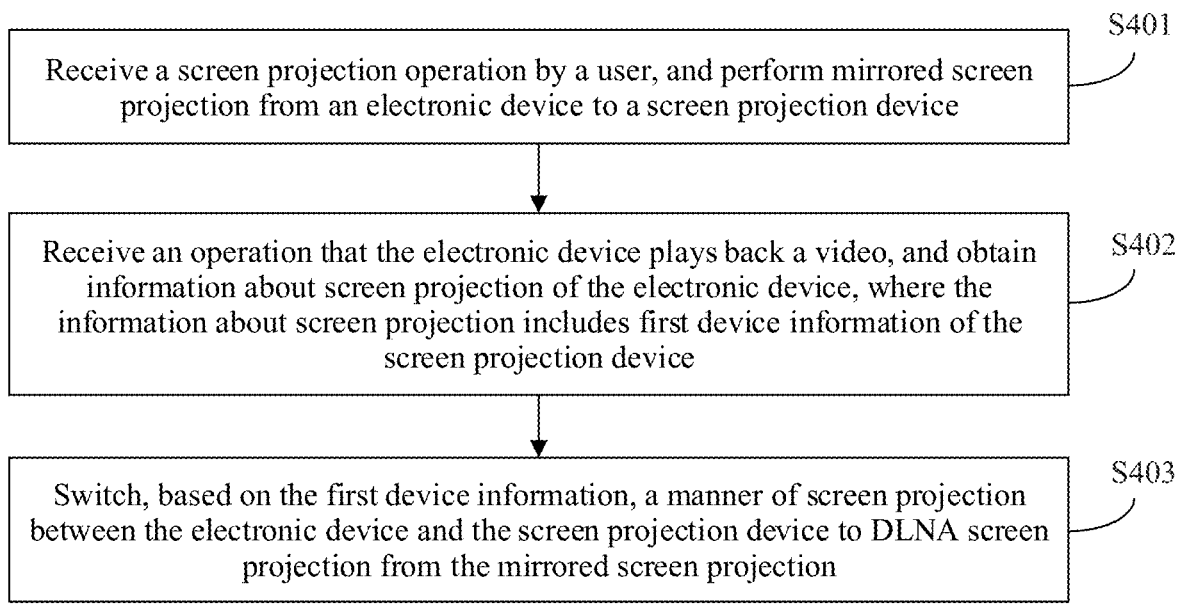
FIG. 11 is a schematic flowchart of still another screen projection method for an electronic device according to an embodiment of this application.

Second, an implementation process of the scenario shown in FIG. 2 is introduced, namely, a scenario in which the electronic device enables the mirrored screen projection first, and then plays back a video may be implemented with reference to the system architecture shown in FIG. 6. FIG. 11 is a schematic flowchart of another screen projection method for an electronic device according to an embodiment of this application. The method includes the following steps.

S401: Receive a screen projection operation by a user, and perform mirrored screen projection from the electronic device to a screen projection device.

The screen projection operation is an operation that the user taps a "wireless projection" key in FIG. 2A, or an operation that the user taps a "wireless projection" key through a "settings" path of the electronic device. For a process of the mirrored screen projection in this step, refer to the description in the foregoing embodiments. Details are not described herein.

S402: Receive an operation that the electronic device plays back a video, and obtain information about screen projection of the electronic device, where the information about screen projection includes first device information of the screen projection device.

S403: Switch, based on the first device information, a manner of screen projection between the electronic device and the screen projection device to DLNA screen projection from the mirrored screen projection.

Specifically, after the mirrored screen projection from the electronic device to the screen projection device is performed, information about current screen projection may be stored. If the video APP installed in the electronic device is playing back a video, the video APP actively obtains the information about screen projection. When the electronic device is in a state of the mirrored screen projection, the video APP invokes an internal DLNA interface to switch the manner of screen projection between the electronic device and the screen projection device to the DLNA screen projection from the mirrored screen projection.

Figure 9:
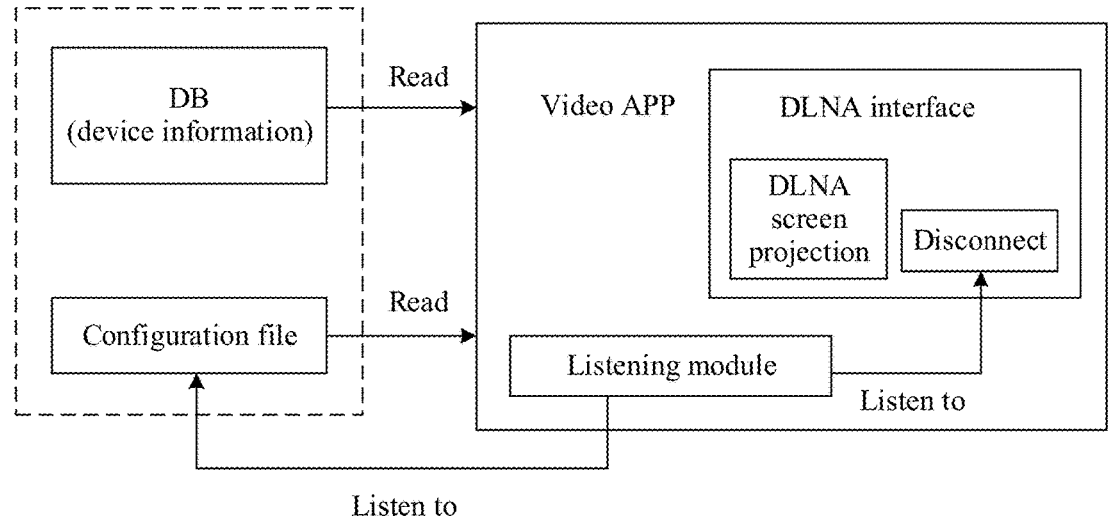
FIG. 9($a$) is a schematic diagram of a process of switching to DLNA screen projection from mirrored screen projection of an electronic device according to an embodiment of this application.
Figure 9:
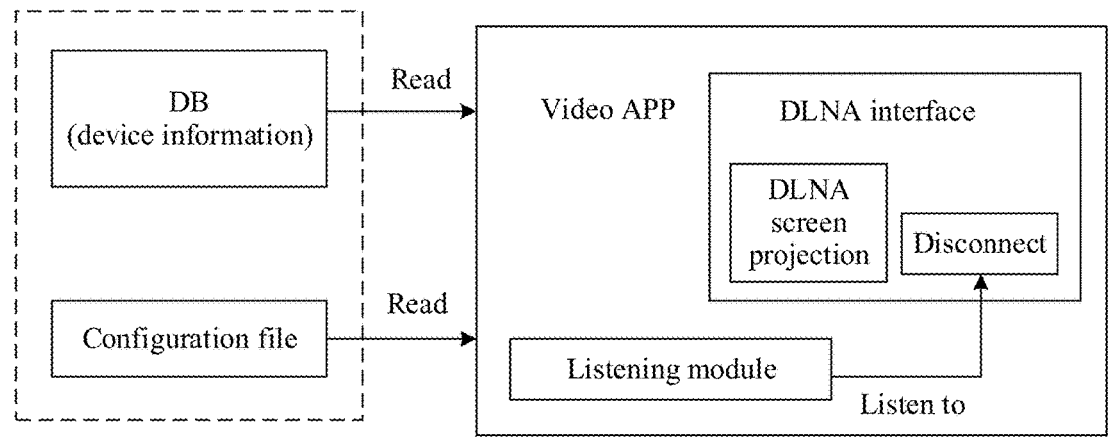

For this process, it may be learned from the manner in which a video is watched in the mode of the mirrored screen projection of the electronic device shown in FIG. 2, that the manner is that the electronic device enables the mirrored screen projection first, and then plays back the video. For this manner, the following describes the process of switching to the DLNA screen projection. Refer to FIG. 9(*b*). The electronic device has been in the mode of the mirrored screen projection. When the user taps the video APP to play back the video, the video APP invokes a system interface to obtain data in Settings and a DB. When the state identifier in Settings is that the mirrored screen projection has been enabled, and the device information of the connected screen projection device is included in the DB, the manner of screen projection between the electronic device and the screen projection device is switched to the DLNA screen projection from the mirrored screen projection. A difference between this manner and the manner in FIG. 9(*a*) lies in that a listening module ContentObserver is not to be started to actively listen to a state of the system-mirrored screen projection.

In the foregoing screen projection method for the electronic device, when the electronic device plays back a video, if the electronic device has been currently in the state of the system-mirrored screen projection, the mirrored screen projection may be automatically switched to the DLNA screen projection. This may resolve problems such as black borders, freezing, screen distortion, and audio-visual unsynchronization on an image. A video image that is played back is clear and smooth. This effectively improves screen projection effect, and improves viewing experience of the user without another operation performed by the user.

In an actual scenario, when the DLNA screen projection from the electronic device to the screen projection device is performed, switching to the DLNA screen projection may be successfully performed only when a screen projection device determined by the electronic device through a DLNA protocol and a connected screen projection device (or a screen projection device at which the mirrored screen projection has been performed) are a same device. It may be learned from the foregoing descriptions that, after a connection between the electronic device and the screen projection device is established, the device information of the screen projection device may be recorded in the DB, including an IP address, a MAC address, a UUID, a device identifier, and a device name. Then the electronic device may search for, through the DLNA protocol, an available screen projection device that supports the DLNA screen projection, obtain device information of the available screen projection device that supports the DLNA screen projection, compare the device information of the available screen projection device that supports the DLNA screen projection with the device information in the DB, and switch the mirrored screen projection to the DLNA screen projection if the comparison succeeds.

In an implementation, device information (1) of the screen projection device recorded in the DB (that is, device information of a screen projection device to which the system-mirrored screen projection is performed from the electronic device) includes the IP address. Device information (2) of the available screen projection device that is searched by the electronic device through the DLNA protocol also includes the IP address. If the electronic device searches for the screen projection device through a mirroring protocol, for example, a Lelink protocol, in a same wireless local area network, and the available screen projection device is searched through the DLNA protocol in the same wireless local area network, an obtained IP address of the device information (1) and an obtained IP address of the device information (2) are the same. Therefore, the video APP in the electronic device may directly obtain the IP address of the device information (1) from the DB, and may be projected, in a manner of the DLNA screen projection, to a screen projection device corresponding to the IP address, to complete a DLNA screen projection process. Optionally, in this implementation, because the IP address of the device information (1) and the IP address of the device information (2) are the same, the electronic device may directly perform the DLNA screen projection based on the IP address of the device information (1) in the DB, without searching through the DLNA protocol.

In another implementation, the device information (1) of the screen projection device recorded in the DB (that is, the device information of the screen projection device to which the system-mirrored screen projection is performed from the electronic device) may include an IP address, a MAC address, a UUID, and a device name. The device information (2) of the available screen projection device searched by the electronic device through the DLNA protocol may include an IP address, a MAC address, a UUID, and a device name. If the electronic device searches for the screen projection device through the mirroring protocol, for example, a Miracast protocol or a Cast+ protocol (may be searched through Wi-Fi P2P), not in a same local area network, and an available screen projection device may be searched through the DLNA protocol in the same wireless local area network, the IP address of the device information (1) and the IP address of the device information (2) are not the same. Therefore, the electronic devices are to write the IP address of the device information (2) into the DB for the video APP to query. For example, if the user intends to project a mobile phone to a television in a living room for watching a video, both the mobile phone and the television are connected to a Wi-Fi in the living room. During the mirrored screen projection, searching may be performed through the Wi-Fi P2P. In this case, an IP address of the television obtained by the mobile phone is 192.168.49.1. In a process of switching to the DLNA screen projection, the television is to be searched through the DLNA protocol in the Wi-Fi wireless network in the living room. In this case, the IP address of the television obtained by the mobile phone is 192.168.43.238. The two IP addresses are different.

Figure 12:
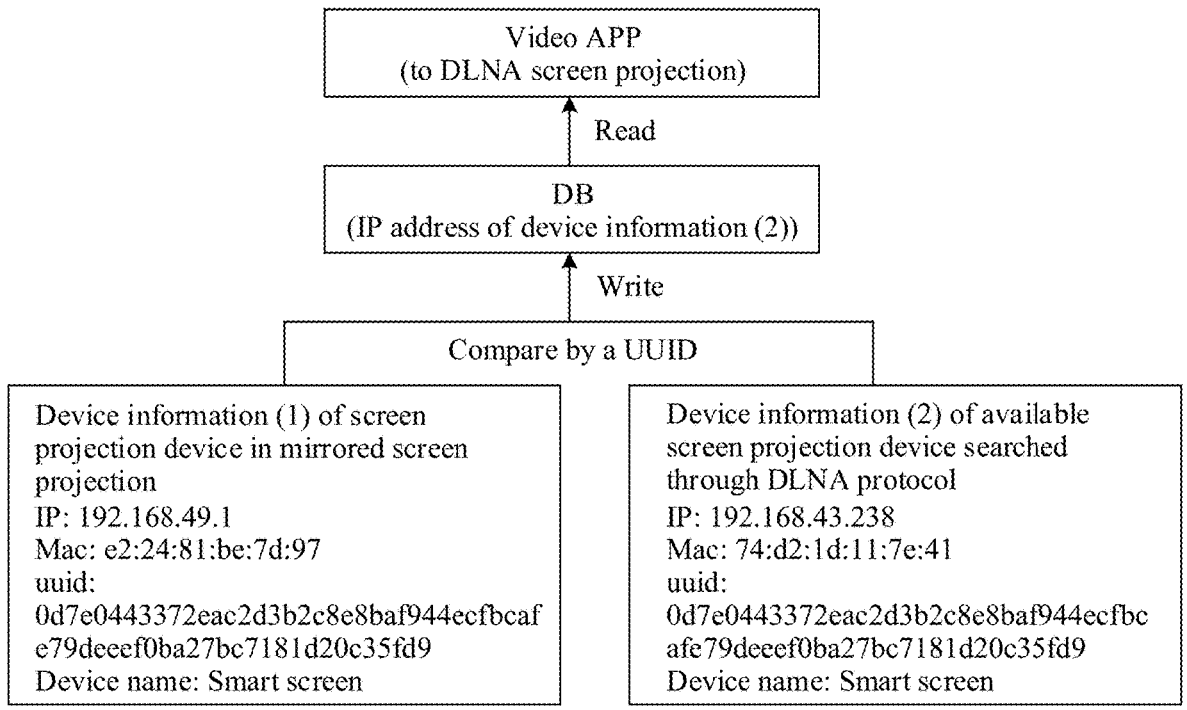
FIG. 12 is a schematic diagram of comparison between information about a device for mirrored screen projection and information about a device for DLNA screen projection according to an embodiment of this application.

Optionally, there may be one or more available screen projection devices searched through the DLNA protocol. For example, the device information (1) of the screen projection device and the device information (2) of the available screen projection device may be shown in FIG. 12. It may be found, through comparison, that because the UUID is a unique identifier of a device, only UUID information in the device information (1) and UUID information of the device information (2) are the same. Therefore, in this embodiment of this application, association may be performed based on the UUID. If there is one available screen projection device searched through the DLNA protocol, the electronic device compares the UUID of the device information (2) with the UUID of a device information (1). If the two UUIDs are the same, the available screen projection device and the screen projection device are a same device, namely, a screen projection device that is being in the mirrored screen projection. The electronic device may write the IP address (for example, 192.168.43.238 in FIG. 9) of the device information (2) into the DB. Then, the video APP may obtain the IP address from the DB, and may be projected, in a manner of the DLNA screen projection, to a screen projection device corresponding to the IP address, to complete the DLNA screen projection process.

If there are a plurality of available screen projection devices searched through the DLNA protocol, the electronic device determines a device that is in the available screen projection devices and of which UUID is the same as the UUID of the screen projection device for the mirrored screen projection as a target screen projection device (that is, the same as the screen projection device or the screen projection device that is being in the mirrored screen projection), and writes an IP address of the target screen projection device into the DB. Then, the video APP may obtain the IP address of the target screen projection device from the DB, and may be projected, in a manner of the DLNA screen projection, to the screen projection device corresponding to the IP address, to complete the DLNA screen projection process.

Optionally, after the DLNA screen projection from electronic device to the screen projection device is performed, the video APP may also store the device information (2) in a whitelist. When the mirrored screen projection is completed for the electronic device next time, the video APP first compares device information of a screen projection device for the mirrored screen projection with the device information in the whitelist. If the comparison succeeds, the DLNA screen projection to a device corresponding to the IP address is performed based on the IP address in the whitelist. If the comparison does not succeed, the available device is searched through the DLNA protocol. This may reduce the number of times of DLNA searching, and improve efficiency of screen projection switching.

In the foregoing implementation, the electronic device associates with the screen projection device by using the unique identifier UUID. This may improve accuracy of the determined DLNA screen projection device, to ensure that the screen projection device determined through the DLNA protocol and the screen projection device determined for the mirrored screen projection are a same device, improving success rate of the DLNA screen projection.

In still another implementation, the device information (1) of the screen projection device recorded in the DB (that is, the device information of the screen projection device to which the system-mirrored screen projection is performed from the electronic device) may include an IP address, a MAC address, a device identifier, and a device name. The device information (2) of the available screen projection device searched by the electronic device through the DLNA protocol may include an IP address, a MAC address, a device identifier, and a device name. In other words, the UUID is not included in the device information obtained in this scenario. The device identifier is other information for identifying the screen projection device, and the device identifier searched through the mirroring protocol and the device identifier searched through the DLNA protocol may not be the same.

Figure 13:
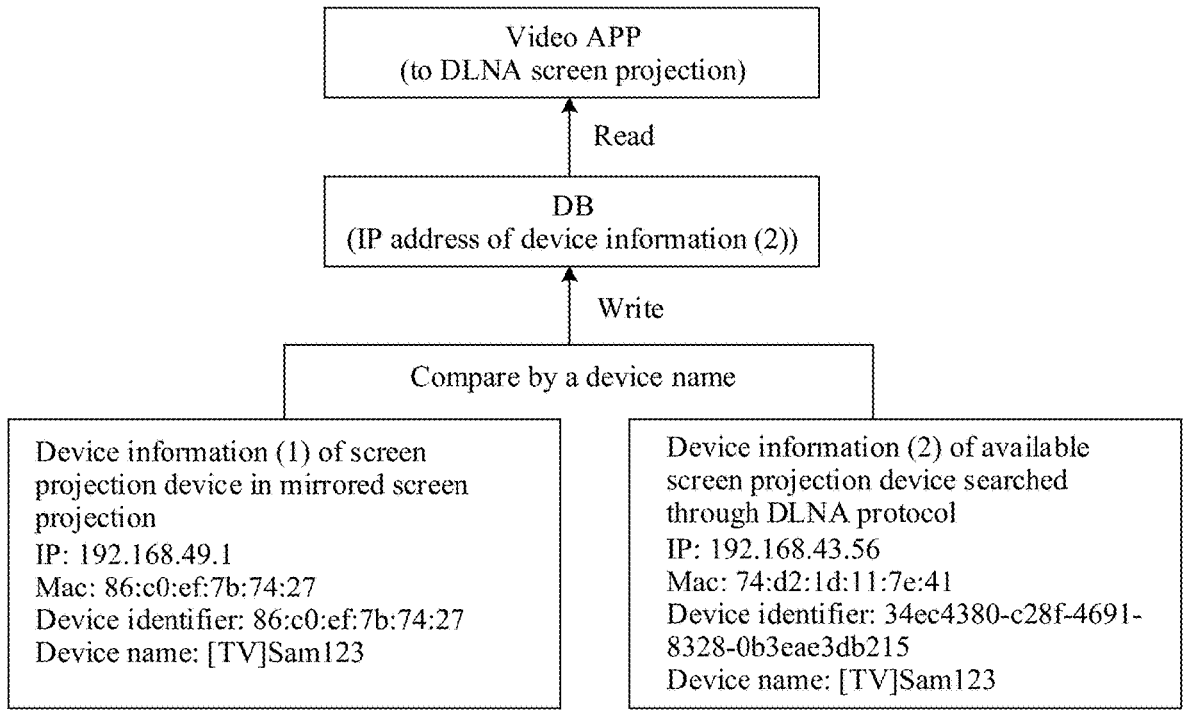
FIG. 13 is a schematic diagram of another comparison between information about a device for mirrored screen projection and information about a device for DLNA screen projection according to an embodiment of this application.

For example, the device information (1) of the screen projection device and the device information (2) of the available screen projection device may be shown in FIG. 13. It may be found, through comparison, that only information about a device name in the device information (1) and information about a device name in the device information (2) are the same. Therefore, in this embodiment of this application, association may be performed based on the device names. If there is one available screen projection device searched through the DLNA protocol, the electronic device compares the device name of the device information (2) with the device name of the device information (1). If the two device names are the same, the available screen projection device and the screen projection device are a same device, namely, a screen projection device that is being in the mirrored screen projection. The electronic device may write the IP address (for example, 192.168.43.56 in FIG. 10) of the device information (2) into the DB. Then, the video APP may obtain the IP address from the DB, and may be projected, in a manner of the DLNA screen projection, to a screen projection device corresponding to the IP address, to complete the DLNA screen projection process.

If there are a plurality of available screen projection devices searched through the DLNA protocol, the electronic device determines a device that is in the available screen projection devices and of which a device name is the same as the device name of the screen projection device for the mirrored screen projection as a target screen projection device (that is, the same as the screen projection device or the screen projection device that is being in the mirrored screen projection), and writes an IP address of the target screen projection device into the DB. Then, the video APP may obtain the IP address of the target screen projection device from the DB, and may be projected, in a manner of the DLNA screen projection, to a screen projection device corresponding to the IP address, to complete the DLNA screen projection process. If there are a plurality of devices that are in the available screen projection devices and of which names are the same as the device name of the screen projection device. In this case, the electronic device does not recognize which device is the same as the screen projection device. In this case, the electronic device may output a list of these several devices through a display interface, so that the user may perform selection based on a device of the user for the mirrored screen projection.

In the implementation, when the UUID is not included in device information of a searched screen projection device, the electronic device may be associated based on the device name, to adapt to a process of screen projection switching in different scenarios. In addition, when there are a plurality of searched devices for the DLNA screen projection, the user may select and determine the DLNA screen projection devices. This further improves viewing experience of the user.

In a scenario, when the user determines to watch a local video in the mode of the mirrored screen projection of the electronic device, the electronic device may also perform the DLNA screen projection in the foregoing method. The local video may be played back by a "gallery" application, or may be played back by a player of the electronic device. When the "gallery" application or the player of the electronic device is playing back the video, and the mode of the mirrored screen projection has been enabled, the DLNA screen projection is performed between the electronic device and the screen projection device. For a specific screen projection process, refer to the description in the foregoing embodiments. Details are not described herein. It should be noted that the DLNA screen projection only supports audio and video data in a fixed format, for example, image data in a format of JPEG, PNG, GIF, or the like, audio data in a format of AAC, MP3, WMA, or the like, and video data in a format of MPEG-2, MPEG-4, AVC, WMV, or the like. Before performing screen projection switching, the electronic device may also determine the format of the video data. If the format of the video data meets a condition, the manner of screen projection may be switched to the DLNA screen projection. If the format of the video data does not meet a condition, the manner of screen projection is not switched.

The foregoing describes in detail examples of the screen projection method for the electronic device provided in embodiments of this application. It may be understood that, to implement the foregoing functions, the electronic device includes corresponding hardware and/or software modules for performing the functions. It should be readily appreciated by a person skilled in the art that the example units, algorithms, and steps described with reference to the embodiments disclosed in this specification can be implemented in this application by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment of this application, the electronic device may be divided into functional modules based on the foregoing method examples. For example, the electronic device may be divided into functional modules corresponding to the functions, such as a detection unit, a processing unit, and a display unit; or two or more functions may be integrated into one module. The integrated module may be implemented in a form of hardware, or may be implemented in a form of a software functional module. It should be noted that, in embodiments of this application, division into the modules is an example and is merely logical function division, and may be other division in an actual implementation.

It should be noted that all related content of the steps in the foregoing method embodiments may be cited in function description of corresponding functional modules. Details are not described herein.

The electronic device provided in this embodiment of this application is configured to perform the screen projection of the electronic device, and therefore, can achieve same effect as the foregoing implementation method.

When an integrated unit is used, the electronic device may further include a processing module, a storage module, and a communication module. The processing module may be configured to control and manage an action of the electronic device. The storage module may be configured to support the electronic device in storing program code, data, and the like. The communication module may be configured to support communication between the electronic device and another device.

The processing module may be a processor or a controller. The processor may implement or execute various example logical blocks, modules, and circuits described with reference to content disclosed in this application. Alternatively, the processor may be a combination implementing a computing function, for example, a combination of one or more microprocessors, a combination of a digital signal processor (digital signal processing, DSP) and a microprocessor, or the like. The storage module may be a memory. The communication module may be specifically a device, for example, a radio frequency circuit, a Bluetooth chip, a Wi-Fi chip, or the like that interacts with another electronic device.

In an embodiment, if the processing module is a processor and the storage module is a memory, the electronic device in this embodiment may be a device having a structure shown in FIG. 4.

An embodiment of this application further provides a computer-readable storage medium, where the computer-readable storage medium stores a computer program, and when the computer program is executed by a processor, the processor is enabled to perform screen projection of the electronic device in any one of the foregoing embodiments.

An embodiment of this application further provides a computer program product. When the computer program product is run on a computer, the computer is enabled to perform the foregoing related steps, to implement the screen projection of the electronic device in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the screen projection of the electronic device in the foregoing method embodiments.

The electronic device, the computer-readable storage medium, the computer program product, or the chip provided in the embodiments is configured to perform the corresponding method provided above. Therefore, for beneficial effects that can be achieved, refer to the beneficial effects of the corresponding method provided above. Details are not described herein.

Based on the descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on requirements. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. The parts displayed as units may be one or more physical units, which may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. An electronic device, comprising:
   one or more processors;
   one or more memories; and
   a module at which a plurality of applications are installed, wherein
   the memory stores one or more programs, and when the one or more programs are executed by the processor, the electronic device is enabled to perform the following steps:
   receiving an operation that the electronic device plays back a video, and, in response, obtaining a state identifier of the electronic device, wherein the state identifier indicates whether the electronic device is in a state of system-mirrored screen projection in which content displayed on the electronic device is mirrored on another device;
   starting a content observer to monitor whether the electronic device is in the state of the system-mirrored screen projection in response to determining, based on the state identifier, that the electronic device is not in the state of the system-mirrored screen projection;
   in response to receiving a screen projection operation by a user, performing mirrored screen projection from the electronic device to a screen projection device and, changing the state identifier to indicate that the electronic device is in the state of the system-mirrored screen projection; and
   in response to the content observer detecting that the electronic device is in the state of system-mirrored screen projection:
      searching for a first available screen projection device through a DLNA protocol, and obtaining second device information of the first available screen projection device, wherein the first available screen projection device is a device that is in a same local area network as the electronic device and that supports the DLNA screen projection, and the second device information comprises at least one of an IP address, a MAC address, a UUID, a device identifier, and a device name of the first available screen projection device, determining first device information matches the second device information, and in response to determining the first device information matches the second device information, performing digital living network alliance (DLNA) screen projection from the electronic device to the screen projection device based on the first device information to automatically switch the manner of screen projection between the electronic device and the screen projection device to the DLNA screen projection from the system-mirrored screen projection.

2. The electronic device according to claim 1, wherein when the one or more programs are executed by the one or more processors, the electronic device is enabled to perform the following steps:

sending a video address of the video to the screen projection device based on the IP address of the first available screen projection device, to enable the screen projection device to download a video resource based on the video address and play back the video resource.

3. The electronic device according to claim 1, wherein when the one or more programs are executed by the one or more processors, the electronic device is enabled to perform the following steps:

receiving the screen projection operation, and establishing a channel connection between the electronic device and the screen projection device; and obtaining the first device information of the screen projection device.

4. The electronic device according to claim 1, wherein when the one or more programs are executed by the one or more processors, the electronic device is enabled to perform the following steps:

receiving the screen projection operation;

searching for and displaying a second available screen projection device through a mirroring protocol;

receiving an operation of selecting the second available screen projection device, to determine the screen projection device; and sending, based on the first device information, video data that is played back by the electronic device to the screen projection device for display.

5. The electronic device according to claim 3, wherein when the one or more programs are executed by the one or more processors, the electronic device is enabled to perform the following steps:

storing the state identifier indicating that the electronic device is in the state of the system-mirrored screen projection into a configuration file, and storing the first device information of the screen projection device to a database.

6. The electronic device according to claim 1, wherein when the one or more programs are executed by the one or more processors, the electronic device is enabled to perform the following steps:

receiving a connection operation, and establishing a channel connection between the electronic device and the screen projection device.

7. The electronic device according to claim 1, wherein the video is played back by a video application installed in the electronic device.

8. The electronic device according to claim 7, wherein when the one or more programs are executed by the one or more processors, the electronic device is enabled to perform the following steps:

invoking, by the video application, a DLNA interface, to project to the screen projection device in a manner of DLNA screen projection.

9. The electronic device according to claim 7, wherein when the one or more programs are executed by the one or more processors, the electronic device is enabled to perform the following steps:

receiving an operation that the video application plays back a video, and obtaining the state identifier from a configuration file.

10. The electronic device according to claim 5, wherein when the one or more programs are executed by the one or more processors, the electronic device is enabled to perform the following steps:

obtaining the first device information from the database.

11. The electronic device according to claim 1, wherein the electronic device further comprises:

a video application, configured to play back a video, and obtain the identifier from a configuration file; determine, based on the state identifier, that the electronic device is not in the state of the system-mirrored screen projection; and listen to whether the state identifier of the electronic device is changed;

a wireless projection module, configured to receive the screen projection operation;

a screen projection capability center module, configured to search for a second available screen projection device through a mirroring protocol;

a display module, configured to: display the second available screen projection device, and receive an operation of selecting the second available screen projection device, to determine the screen projection device; and a multi-screen interaction module, configured to send, based on the first device information, video data that is played back by the electronic device to the screen projection device for display, wherein the multi-screen interaction module is further configured to store a state identifier indicating that the electronic device is in the state of the system-mirrored screen projection to the configuration file, and the wireless projection module is further configured to store the first device information of the screen projection device to a database;

when the video application listens and obtains that the state identifier is changed to the state identifier indicating that the electronic device is in the state of the system-mirrored screen projection, the video application is further used to obtain the first device information from the database;

the screen projection capability center module is further configured to search for a first available screen projection device through a DLNA protocol; and the multi-screen interaction module is further configured to obtain second device information of the first available screen projection device, match the first device information with the second device information, and if the first device information is successfully matched with the second device information, send a video address of the video to the screen projection device based on an IP address of the first available screen projection device, to enable the screen projection device to download a video resource based on the video address and play back the video resource.

12. A computer-readable storage medium comprising a computer program, which when executed by a processor, cause the processor to perform operations comprising:

receiving an operation that an electronic device plays back a video, and, in response, obtaining a state identifier of the electronic device, wherein the state identifier indicates whether the electronic device is in a state of system-mirrored screen projection in which content displayed on the electronic device is mirrored on another device;

starting a content observer to monitor whether the electronic device is in the state of the system-mirrored screen projection in response to determining, based on the state identifier, that the electronic device is not in the state of the system-mirrored screen projection;

in response to receiving a screen projection operation by a user, performing mirrored screen projection from the electronic device to a screen projection device and, changing the state identifier to indicate that the electronic device is in the state of the system-mirrored screen projection; and in response to the content observer detecting that the electronic device is in the state of system-mirrored screen projection:

searching for a first available screen projection device through a DLNA protocol, and obtaining second device information of the first available screen projection device, wherein the first available screen projection device is a device that is in a same local area network as the electronic device and that supports the DLNA screen projection, and the second device information comprises at least one of an IP address, a MAC address, a UUID, a device identifier, and a device name of the first available screen projection device, determining first device information matches the second device information, and in response to determining the first device information matches the second device information, performing digital living network alliance (DLNA) screen projection from the electronic device to the screen projection device based on the first device information to automatically switch the manner of screen projection between the electronic device and the screen projection device to the DLNA screen projection from the system-mirrored screen projection.

13. The computer-readable storage medium according to claim 12, wherein the processor is further caused to perform operations comprising storing the state identifier indicating that the electronic device is in the state of the system-mirrored screen projection into a configuration file, and storing the first device information of the screen projection device to a database.

14. The computer-readable storage medium according to claim 12, wherein the processor is further caused to perform operations comprising sending a video address of the video to the screen projection device based on the IP address of the first available screen projection device, to enable the screen projection device to download a video resource based on the video address and play back the video resource.

15. A screen projection method for an electronic device, wherein the method comprises:

starting a content observer to monitor whether the electronic device is in the state of the system-mirrored screen projection in response to determining, based on the state identifier, that the electronic device is not in the state of the system-mirrored screen projection;

in response to receiving a screen projection operation by a user, performing mirrored screen projection from the electronic device to a screen projection device and changing the state identifier to indicate that the electronic device is in the state of the system-mirrored screen projection; and in response to the content observer detecting that the electronic device is in the state of system-mirrored screen projection:

searching for a first available screen projection device through a DLNA protocol, and obtaining second device information of the first available screen projection device, wherein the first available screen projection device is a device that is in a same local area network as the electronic device and that supports the DLNA screen projection, and the second device information comprises at least one of an IP address, a MAC address, a UUID, a device identifier, and a device name of the first available screen projection device, determining first device information matches the second device information, and in response to determining the first device information matches the second device information, performing digital living network alliance (DLNA) screen projection from the electronic device to the screen projection device based on the first device information to automatically switch the manner of screen projection between the electronic device and the screen projection device to the DLNA screen projection from the system-mirrored screen projection.

16. The screen projection method according to claim 15, wherein the method further comprises: storing the state identifier indicating that the electronic device is in the state of the system-mirrored screen projection into a configuration file, and storing the first device information of the screen projection device to a database.

* * * * *